US009419953B2

(12) United States Patent
Von Bokern et al.

(10) Patent No.: US 9,419,953 B2
(45) Date of Patent: *Aug. 16, 2016

(54) TRUSTED CONTAINER

(71) Applicant: McAfee Inc., Santa Clara, CA (US)

(72) Inventors: Vincent Edward Von Bokern, Rescue, CA (US); Purushottam Goel, Portland, OR (US); Sven Schrecker, San Marcos, CA (US); Ned McArthur Smith, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 13/726,167

(22) Filed: Dec. 23, 2012

(65) Prior Publication Data
US 2014/0181894 A1 Jun. 26, 2014

(51) Int. Cl.
H04L 29/06 (2006.01)

(52) U.S. Cl.
CPC .......... *H04L 63/061* (2013.01); *H04L 63/0823* (2013.01); *H04L 63/20* (2013.01)

(58) Field of Classification Search
CPC .... H04L 63/061; H04L 63/20; H04L 63/0823
USPC ...................................... 726/1, 3, 7
See application file for complete search history.

(56) References Cited

U.S. PATENT DOCUMENTS

| 5,513,245 A | 4/1996 | Mizikovsky et al. |
| 5,657,388 A | 8/1997 | Weiss |
| 5,940,589 A | 8/1999 | Donovan et al. |
| 5,987,610 A | 11/1999 | Franczek et al. |
| 6,073,142 A | 6/2000 | Geiger et al. |
| 6,460,050 B1 | 10/2002 | Pace et al. |
| 7,231,449 B2 | 6/2007 | Ellison et al. |
| 7,334,254 B1* | 2/2008 | Boydstun et al. ................ 726/2 |
| 7,506,155 B1 | 3/2009 | Stewart et al. |
| 7,532,723 B2 | 5/2009 | Chitrapu et al. |

(Continued)

FOREIGN PATENT DOCUMENTS

| EP | 1746764 | 1/2007 |
| JP | 2012-182812 A | 9/2012 |

(Continued)

OTHER PUBLICATIONS

International Search Report and Written Opinion in International Application No. PCT/US2013/075224, mailed Apr. 24, 2014, 10 pages.

(Continued)

*Primary Examiner* — Matthew Henning
(74) *Attorney, Agent, or Firm* — Trop, Pruner & Hu, P.C.

(57) ABSTRACT

A secure identifier is derived, using a secured microcontroller of a computing device, that is unique to a pairing of the computing device and a particular domain. Secure posture data corresponding to attributes of the computing device is identified in secured memory of the computing device. The secure identifier and security posture is sent in a secured container to a management device of the particular domain. The particular domain can utilize the information in the secured container to authenticate the computing device and determine a security task to be performed relating to interactions of the computing device with the particular domain.

20 Claims, 13 Drawing Sheets

(56) References Cited

U.S. PATENT DOCUMENTS

| | | | |
|---|---|---|---|
| 8,020,192 | B2 | 9/2011 | Wright et al. |
| 8,151,360 | B1* | 4/2012 | Kishore et al. ............... 726/28 |
| 8,230,480 | B2 | 7/2012 | Fazal et al. |
| 8,341,693 | B2 | 12/2012 | Shahbazi |
| 8,412,816 | B2 | 4/2013 | Jreij et al. |
| 8,590,030 | B1 | 11/2013 | Pei |
| 8,726,298 | B1 | 5/2014 | Desai et al. |
| 8,850,543 | B2 | 9/2014 | Von Bokern et al. |
| 8,955,075 | B2 | 2/2015 | Von Bokern et al. |
| 8,966,075 | B1* | 2/2015 | Chickering ......... H04L 12/4641 709/220 |
| 2001/0027519 | A1 | 10/2001 | Gudbjartsson et al. |
| 2003/0061512 | A1 | 3/2003 | Flurry et al. |
| 2003/0131222 | A1 | 7/2003 | Thomas, III |
| 2004/0139052 | A1 | 7/2004 | Kazushige et al. |
| 2005/0010769 | A1* | 1/2005 | You et al. ................ 713/168 |
| 2005/0081044 | A1* | 4/2005 | Giles et al. ............... 713/182 |
| 2005/0138389 | A1 | 6/2005 | Catherman et al. |
| 2005/0271208 | A1 | 12/2005 | England et al. |
| 2005/0278533 | A1 | 12/2005 | Mayer |
| 2006/0015728 | A1 | 1/2006 | Ballinger et al. |
| 2006/0020793 | A1* | 1/2006 | Rogers ............... H04L 63/0807 713/168 |
| 2006/0053234 | A1 | 3/2006 | Kumar et al. |
| 2006/0104474 | A1 | 5/2006 | Neogi |
| 2006/0177056 | A1 | 8/2006 | Rostin et al. |
| 2007/0005766 | A1 | 1/2007 | Singhal et al. |
| 2007/0130472 | A1 | 6/2007 | Buer et al. |
| 2007/0240197 | A1 | 10/2007 | Blumenthal et al. |
| 2007/0263236 | A1 | 11/2007 | Selvaraj |
| 2007/0266422 | A1 | 11/2007 | Germano et al. |
| 2008/0005359 | A1 | 1/2008 | Khosravi et al. |
| 2008/0271122 | A1 | 10/2008 | Nolan et al. |
| 2009/0097459 | A1* | 4/2009 | Jendbro ............. H04L 63/0838 370/338 |
| 2009/0119743 | A1 | 5/2009 | Werner et al. |
| 2009/0158409 | A1* | 6/2009 | Khosravi ........... H04L 63/0823 726/6 |
| 2009/0198993 | A1 | 8/2009 | Kim |
| 2009/0307753 | A1 | 12/2009 | Dupont et al. |
| 2010/0023782 | A1 | 1/2010 | Prakash et al. |
| 2010/0049988 | A1 | 2/2010 | Birman et al. |
| 2010/0074100 | A1* | 3/2010 | Suzuki ............... G06F 11/2025 370/221 |
| 2010/0153726 | A1 | 6/2010 | Liu et al. |
| 2010/0161966 | A1 | 6/2010 | Kwon et al. |
| 2010/0162377 | A1 | 6/2010 | Gonzalez et al. |
| 2010/0169650 | A1 | 7/2010 | Brickell et al. |
| 2010/0251347 | A1 | 9/2010 | Roskind |
| 2011/0145592 | A1 | 6/2011 | Greiner |
| 2011/0173681 | A1 | 7/2011 | Qureshi et al. |
| 2011/0281567 | A1 | 11/2011 | Moliner et al. |
| 2012/0011263 | A1* | 1/2012 | Kamay et al. ............... 709/229 |
| 2012/0023546 | A1 | 1/2012 | Kartha et al. |
| 2012/0079507 | A1 | 3/2012 | Agarwal et al. |
| 2012/0084544 | A1 | 4/2012 | Farina et al. |
| 2012/0131685 | A1 | 5/2012 | Broch et al. |
| 2012/0144195 | A1 | 6/2012 | Nair et al. |
| 2012/0151223 | A1 | 6/2012 | Conde Marques et al. |
| 2012/0151564 | A1 | 6/2012 | Robert et al. |
| 2012/0204032 | A1 | 8/2012 | Wilkins et al. |
| 2012/0210415 | A1 | 8/2012 | Somani et al. |
| 2012/0227094 | A1 | 9/2012 | Begen et al. |
| 2012/0265988 | A1 | 10/2012 | Ehrensvard |
| 2012/0304202 | A1 | 11/2012 | Anderson et al. |
| 2013/0019109 | A1 | 1/2013 | Kang et al. |
| 2013/0219468 | A1 | 8/2013 | Bell |
| 2013/0227662 | A1 | 8/2013 | Crampton |
| 2013/0318343 | A1 | 11/2013 | Bjarnason et al. |
| 2014/0007214 | A1 | 1/2014 | Qureshi et al. |
| 2014/0181844 | A1 | 6/2014 | Von Bokern et al. |
| 2014/0181891 | A1 | 6/2014 | Von Bokern et al. |
| 2014/0181892 | A1 | 6/2014 | Von Bokern et al. |
| 2014/0181893 | A1 | 6/2014 | Von Bokern et al. |

FOREIGN PATENT DOCUMENTS

| | | |
|---|---|---|
| KR | 10-2000-0017956 A | 4/2000 |
| KR | 10-2004-0088985 A | 10/2004 |
| KR | 10-2005-0119515 A | 12/2005 |
| KR | 10-2006-0067035 A | 6/2006 |
| KR | 10-0966236 B1 | 6/2010 |
| WO | 2008004174 | 1/2008 |
| WO | WO 2014/099196 A1 | 6/2014 |
| WO | WO 2014/099687 A1 | 6/2014 |
| WO | WO 2014/099688 A1 | 6/2014 |
| WO | WO 2014/099690 A1 | 6/2014 |
| WO | WO 2014/100781 A1 | 6/2014 |

OTHER PUBLICATIONS

International Search Report and Written Opinion in International Application No. PCT/US2013/075225, mailed Apr. 24, 2014, 9 pages.
International Search Report and Written Opinion in International Application No. PCT/US2013/075227, mailed Apr. 22, 2014, 9 pages.
USPTO Nonfinal Rejection in U.S. Appl. No. 13/725,722, mailed Aug. 14, 2014, 14 pages.
USPTO Sep. 16, 2014 Notice of Allowance in U.S. Appl. No. 13/726,148, 9 pages.
USPTO Nonfinal Rejection in U.S. Appl. No. 13/726,132, mailed Dec. 2, 2014, 34 pages.
USPTO Notice of Allowance in U.S. Appl. No. 13/725,722, mailed Dec. 10, 2014, 7 pages.
International Search Report and Written Opinion in International Application No. PCT/US2013/077340, mailed Apr. 15, 2014, 8 pages.
USPTO Nonfinal Rejection in U.S. Appl. No. 13/726,140, mailed Jan. 31, 2014, 13 pages.
Apple, Inc., "Local and Push Notification Programming Guide," Aug. 2011, 56 pages.
Krawczyk, Hugo, "SIGMA: The 'SIGn-and-Mac' approach to authenticated Diffie-Hellman and its use in the IKE protocols," Advances in Cryptology—CRYPTO 2003, Springer Berlin Heidelberg, 2003, pp. 400-425, 32 pages.
USPTO Nonfinal Rejection in U.S. Appl. No. 13/726,148, mailed Feb. 7, 2014, 13 pages.
International Search Report and Written Opinion in International Application No. PCT/US2013/070459, mailed Feb. 28, 2014, 10 pages.
USPTO May 27, 2014 Notice of Allowance in U.S. Appl. No. 13/726,140, mailed Jan. 31, 2014, 17 pages.
USPTO May 30, 2014 Notice of Allowance in U.S. Appl. No. 13/726,148, mailed Feb. 7, 2014, 14 pages.
RSA Security, Inc. "The Power Behind RSA SecurID® Two-factor User Authentication: RSA ACE/Server®," 2001, 11 pages.
Dirk Balfanz, "FIDO U2F Raw Message Formats", FIDO Alliance Proposed Standard, May 14, 2015, pp. 1-10, FIDO Alliance.
Rolf Lindemann, "FIDO Security Reference", FIDO Alliance Proposed Standard, May 14, 2015, pp. 1-30, FIDO Alliance.
Dirk Balfanz, "FIDO U2F Implementation Considerations", FIDO Alliance Proposed Standard, May 14, 2015, pp. 1-5, FIDO Alliance.
Dirk Balfanz, FIDO U2F Javascript API, FIDO Alliance Proposed Standard, May 14, 2015, pp. 1-7, FIDO Alliance.
Alexei Czeskis, "FIDO NFC Protocol Specification v1.0", FIDO Alliance Proposed Standard, May 14, 2015, pp. 1-5, FIDO Alliance.
Sampath Srinivas, "Universal 2nd Factor (U2F) Overview", FIDO Alliance Proposed Standard, May 14, 2015, pp. 1-5, FIDO Alliance.
Salah Machani, et al., "FIDO UAF Review Draft Spec Set", FIDO Alliance Proposed Standard, Dec. 8, 2014, pp. 1-202.
Korea Intellectual Property Office, Notice of Preliminary Rejection mailed Mar. 7, 2016 in Korean Patent Application No. 2015-7013498. (Translation Redacted).
European Patent Office, Extended European Search Report mailed Jun. 23, 2016 in European Patent Application No. 13864263.2.

* cited by examiner

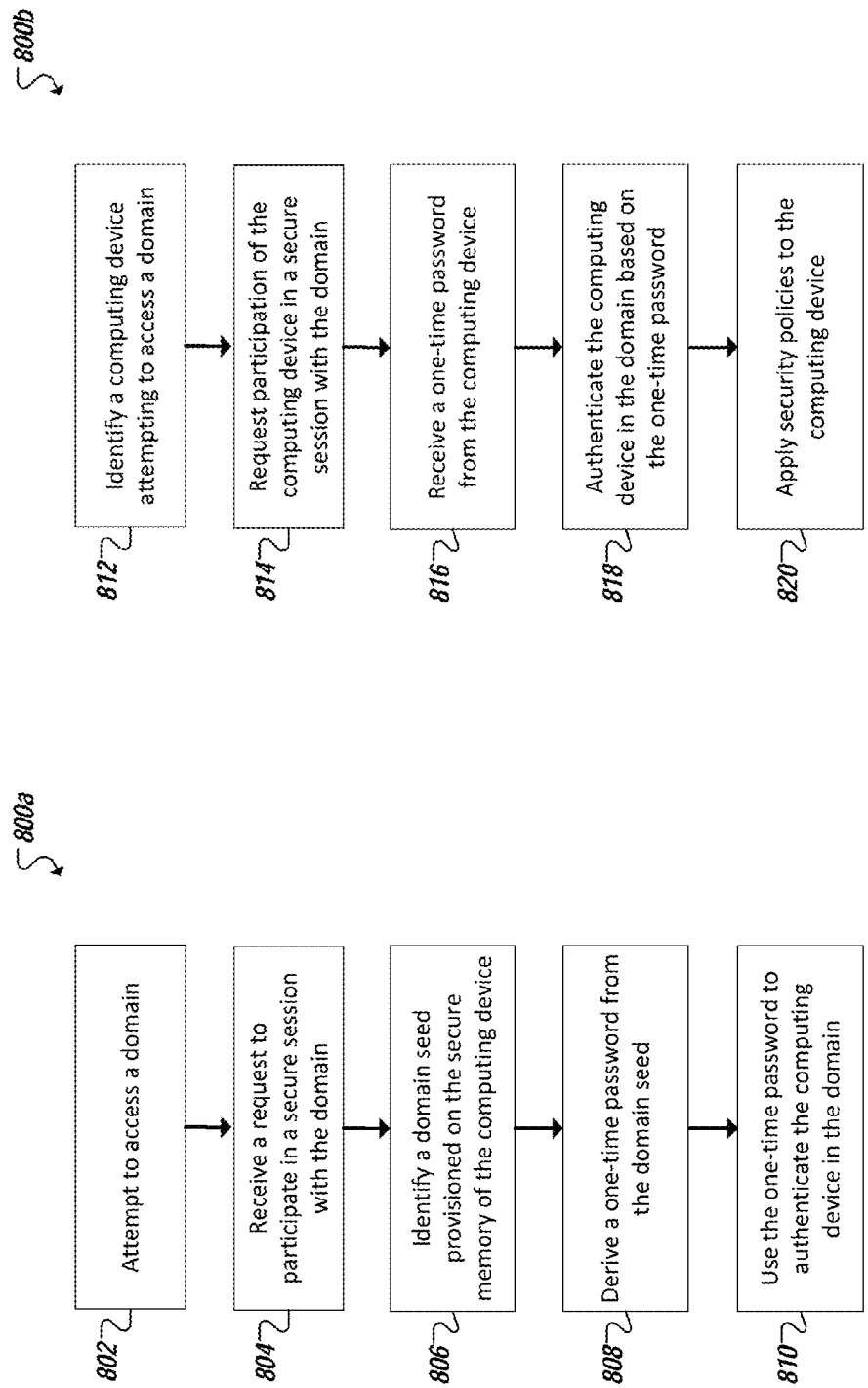

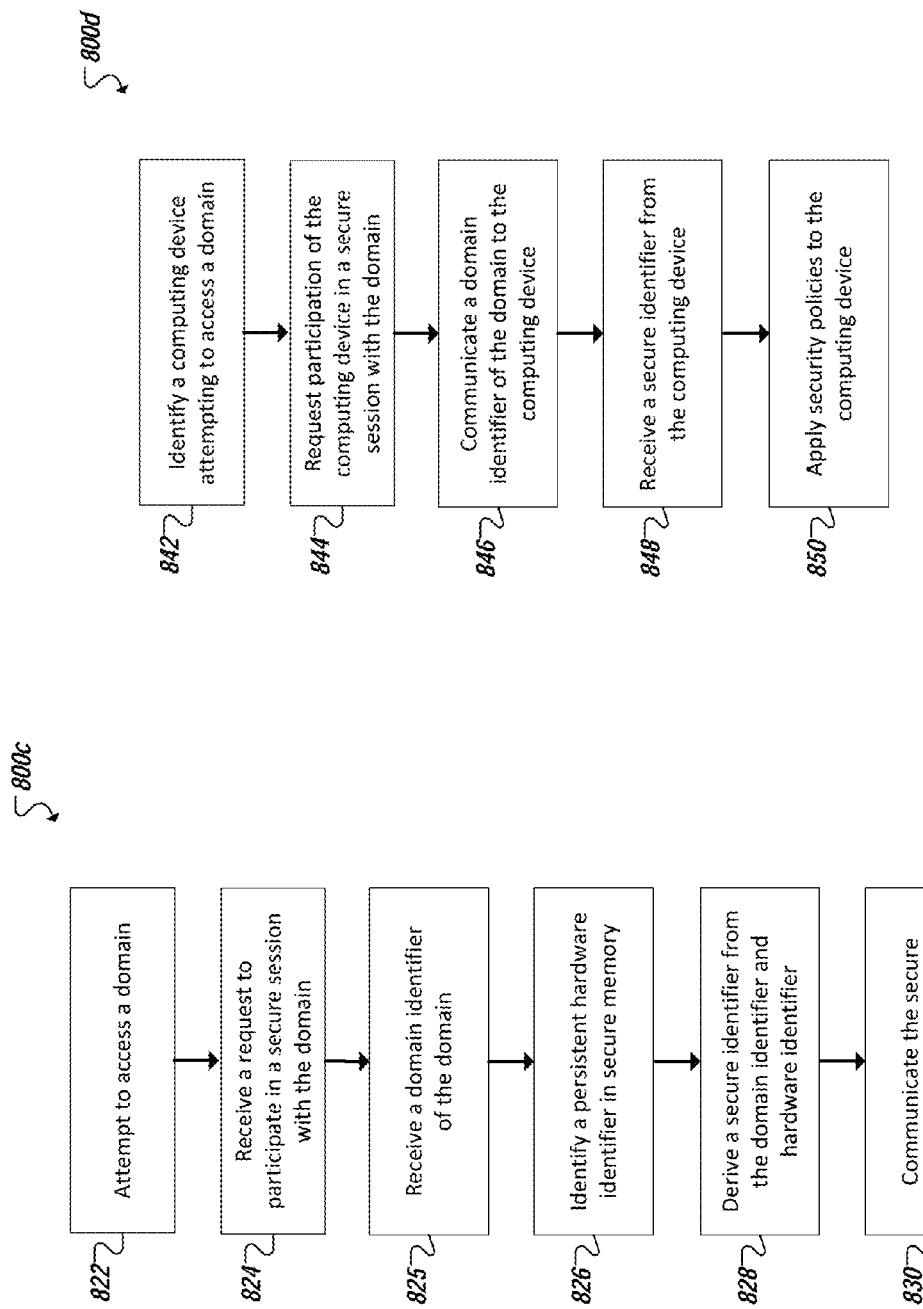

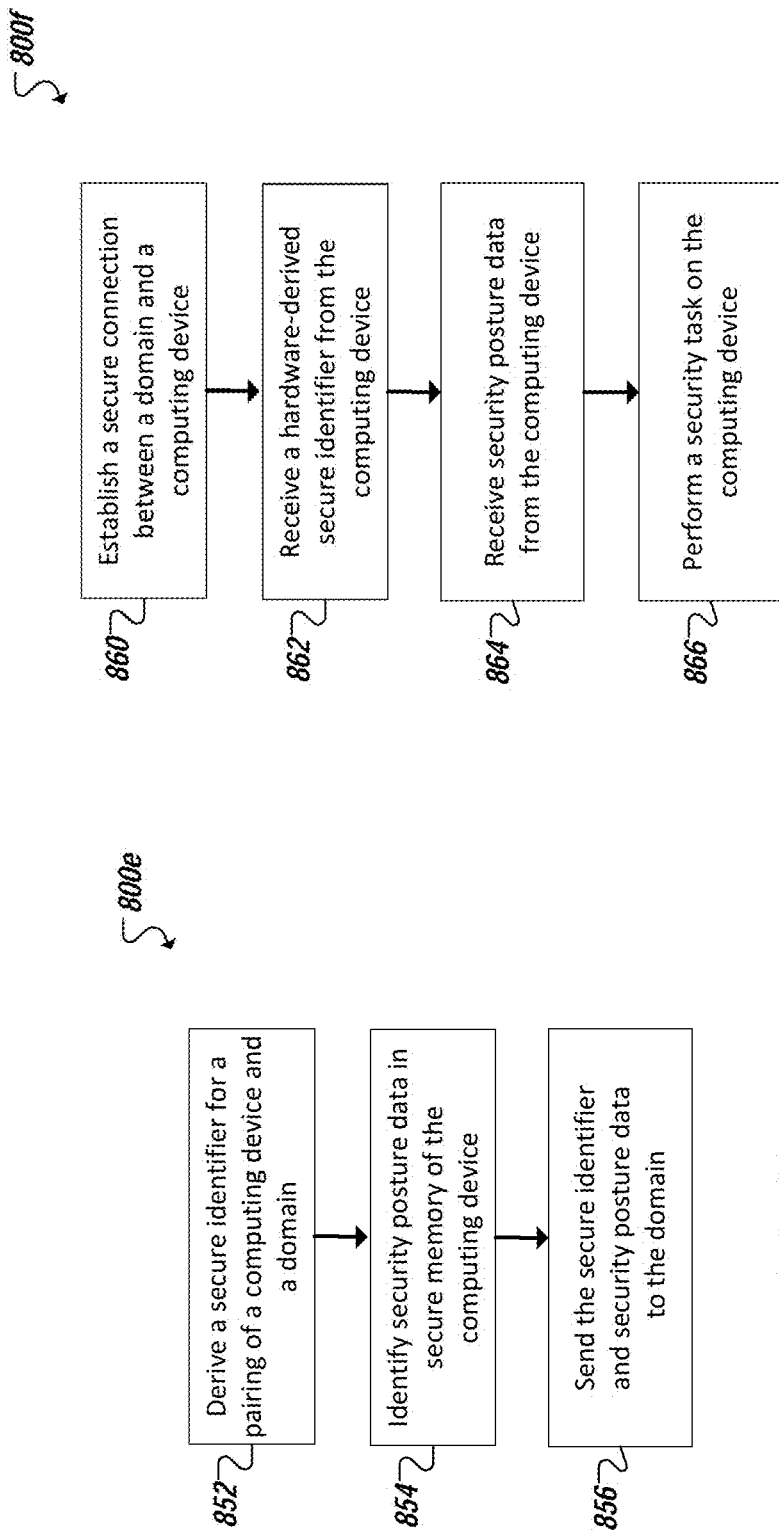

TRUSTED CONTAINER

TECHNICAL FIELD

This disclosure relates in general to the field of computer management and, more particularly, to hardware-based computer security management.

BACKGROUND

Computer systems management within modern enterprises and networks can include the use of tools and techniques for discovering attributes of the respective sub-systems in the network. Security tasks and management can be performed, for example, by assigning and enforcing security policies against devices in the network. Policies can be assigned to particular devices based on known attributes of the devices, for instance. Further, gaining access to and/or communicating with various devices in a network can include software-based tools configured to enable communication of various data between different operating systems and devices. Further, software-based agents can be installed on various devices within a system to provide administrators with the ability to inspect, control, and perform tasks on the devices, including security-related tasks. Traditionally, software-based agents are installed through the operating system of the host device, and the operating system is booted when the agent is active and able to communicate with management services utilizing and performing tasks through the agent. In such instances, management of the host device can be considered dependent on the presence (and operability) of the host device's operating system and/or the presence and operability (and security) of the installed agent.

BRIEF DESCRIPTION OF THE DRAWINGS

FIGS. 8A-8F are simplified flowcharts illustrating example techniques for managing one or more system devices having hardware-based management controllers in accordance with at least some embodiments.

Like reference numbers and designations in the various drawings indicate like elements.

DETAILED DESCRIPTION OF EXAMPLE EMBODIMENTS

Figure 1:
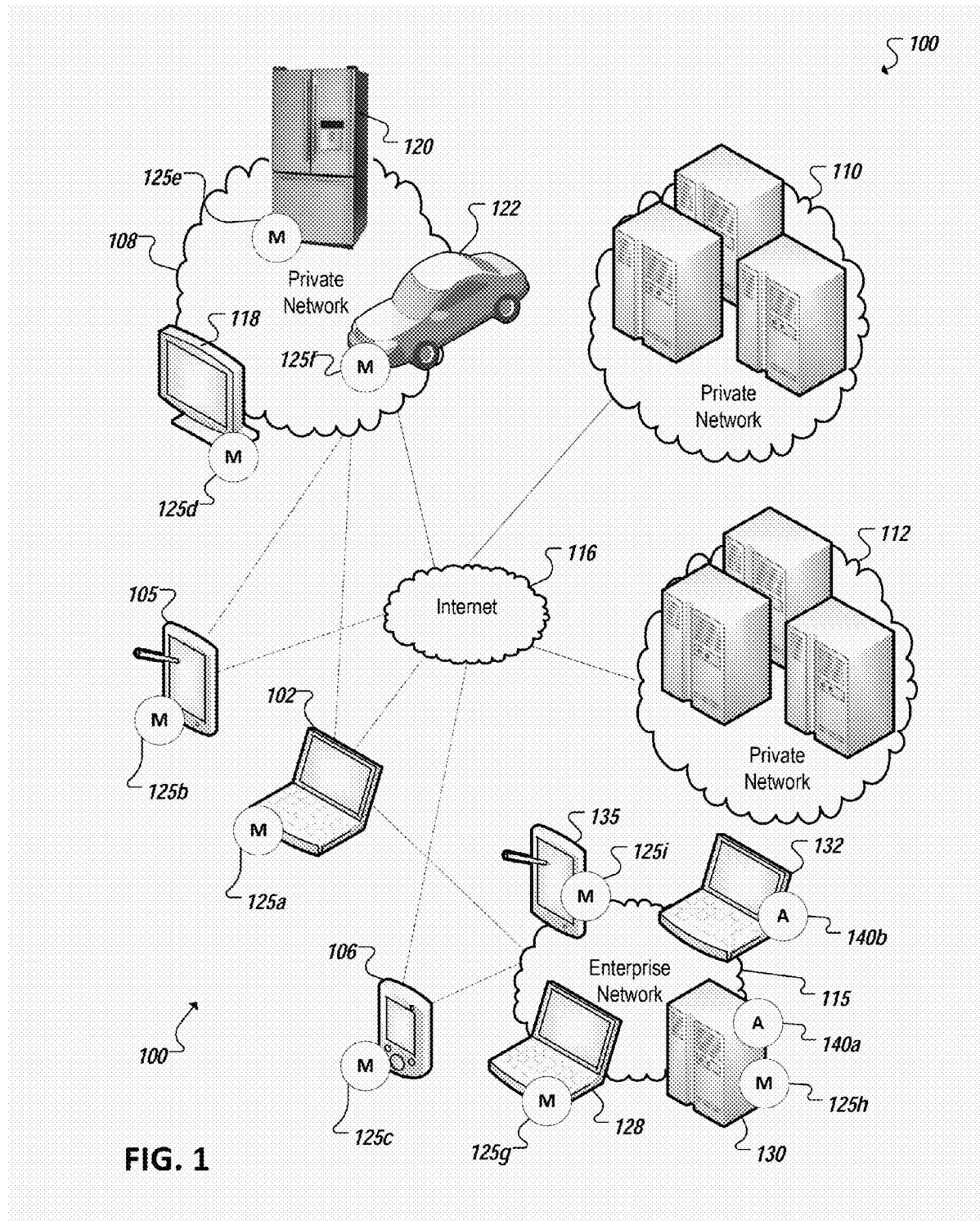
FIG. 1 is a simplified schematic diagram of an example computing system including system devices having hardware-based management controllers in accordance with at least one embodiment.

FIG. 1 is a simplified block diagram illustrating an example computing environment 100 including a plurality of system devices (e.g., 102, 105, 106, 118, 120, 122, 128, 130, 132, 135) capable of interacting with various computing system, networks, or environments (or "domains") (e.g., 108, 110, 112, 115). Some system devices can include a secured hardware-based management controller (e.g., 125a-125i) permitting secure generation and communication of secure identifiers for the system device that can be used in hardware-to-hardware communications and transactions (e.g., circumventing operating system control of the system device) between the secured hardware-based management controller (e.g., 125a-125i) and backend services, such as services of domains 108, 110, 112, 115, over one or more networks, including wide-area networks (WANs) such as the Internet (e.g., 116). In some implementations, hardware-to-hardware communication can take place out-of-band via channels independent or outside the control of the system device's (e.g., 102, 105, 106, 118, 120, 122, 128, 130, 132, 135) operating system.

Domains (e.g., 108, 110, 112, 115) can include computing networks, systems, and environments such as a private home network (e.g., 108), ecommerce system, search engine system, social media system, a network of a commercial or retail establishment (e.g., Internet access points, WiFi hotspots, etc.), and enterprise networks (e.g., 115), among other examples. Some system devices (e.g., 102, 105, 106) can migrate between and operate within multiple different domains (e.g., 108, 110, 112, 115), including, in some instances, multiple environments simultaneously. Multiple secure identifiers can be generated for a single system device, each secure identifier unique to the pairing of the system device with a particular domain. Additionally, backend servers of the domains (e.g., 108, 110, 112, 115) can be provided with functionality for negotiating the communication of the secure identifier as well as mutually authenticating the domain to the system device to ensure that only trusted entities are able to communicate directly with sensitive hardware-based controls (e.g., management controllers) of the system device, among other examples. In some implementations, each domain (e.g., 108, 110, 112, 115) can include a respective management system including functionality for identifying a hardware-based management controller (e.g., 125a-125i), and interfacing and communicating with the management controller of system devices (e.g., 102, 105, 106, 118, 120, 122, 128, 130, 132, 135) to obtain device information from the device and perform security and other device management tasks based on the received device information.

In some implementations, a management controller (e.g., 125a-125i) can be present on the motherboard or chipset of the system device (e.g., 102, 105, 106, 118, 120, 122, 128, 130, 132, 135) and be embodied on a microcontroller or dedicated processor independent of the central processing unit (CPU) (and any operating system) of the system device. A management server can thereby communicate, in-band or out-of-band, with the system device through its respective management controller. In some instances, a management server can provide an application programming interface (API) adapted to allow the management controller of the system device to interface with and receive and respond to instructions and requests of the management server. Such management services and tasks can include the negotiating of communication protocols and establishing of inter-device associations between system devices on a particular network or domain. Management servers can additionally, or alternatively, include system-security-related APIs, with the management server 170, 175 performing security-related tasks for a network 110, 115 through the management controller 108 of the system device.

In some implementations, hardware-based APIs can be established based on the provision of a secure identifier for a corresponding system device. For instance, a secure identifier can serve as the basis of uniquely identifying and authenticating a particular system device (e.g., 102, 105, 118, 122, 120) in a home network domain 108. Secure hardware-to-hardware communications can then be enabled between system devices (e.g., 102, 105, 118, 122, 120) on the home network domain 108 allowing a variety of different interactions between the devices. For instance, interactions, features, interoperations, and tasks can be enabled through such hardware-based management controllers and management systems according to the principles and examples described in U.S. patent application Ser. No. 13/725,722, filed Dec. 21, 2012, entitled "Hardware Management Interface," which is incorporated by reference herein in its entirety. In another example, an enterprise system domain 115 can include a variety of system devices (e.g., 102, 106, 128, 130, 132, 135). The enterprise system domain 115 can utilize unique secure identifiers generated for each of the system devices to authenticate and uniquely identify the devices and apply security policies tailored to each of the devices. Domains can utilize secure identifiers and hardware-based APIs (e.g., authenticated-to through the secure identifiers) to enable to provide services based on a secured authentication of the device.

In general, "servers," "clients," "computing devices," "network elements," "hosts," "system-type system entities," and "systems," including system devices in example computing environment 100 (e.g., 102, 105, 106, 118, 120, 122, 128, 130, 132, 135, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

User, endpoint, or client computing devices can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 108, 110, 112, 115, 116). Computer-assisted, or "smart," appliances can include household and industrial devices and machines that include computer processors and are controlled, monitored, assisted, supplemented, or otherwise enhance the functionality of the devices by the computer processor, other hardware, and/or one or more software programs executed by the computer processor. Computer-assisted appliances can include a wide-variety of computer-assisted machines and products including refrigerators, washing machines, automobiles, HVAC systems, industrial machinery, ovens, security systems, and so on.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Detecting, identifying, tracking, and managing assets in computing systems has traditionally been a significant challenge facing system administrators. A single unknown, poorly understood, or poorly monitored device connected to a network can potentially expose the entire system to a variety security threats and vulnerabilities, including malware, unauthorized data access, rogue users, etc. In some instances, agents (e.g., 140a, 140b) can be installed on system devices (e.g., 130, 132) to assist administrators in obtaining a view of the attributes of the system device, easily detect and communicate with the device on the network, and enforce particular security policies on the system device. Unmanaged devices (i.e., devices that do not possess an installed agent), however, may remain outside the communication, control, and monitoring of management systems designed to enable inter-device communication and operation, detect devices as they enter and leave the network, apply policies to various devices, and enforce security on the network can be hindered by not being able to effectively communicate with such unmanaged devices. Further, installing agents on some devices can be difficult, with the provisioning of agents jeopardized by the very dearth of information concerning the unmanaged device. Additionally, unmanaged devices, in some instances, rather than being able to integrate into a network and be a benefit to the user or the network at large, may be sent to a quarantined or managed sub-network until the unmanaged device can be more carefully inspected by administrators, have an agent installed on it, etc. Additionally, as more and more devices become "smart," in that they are increasingly controlled by computing processors, include network communication adapters, and are able to communicate with other systems, the universe of potentially unmanaged devices continues to increase.

Figure 2:
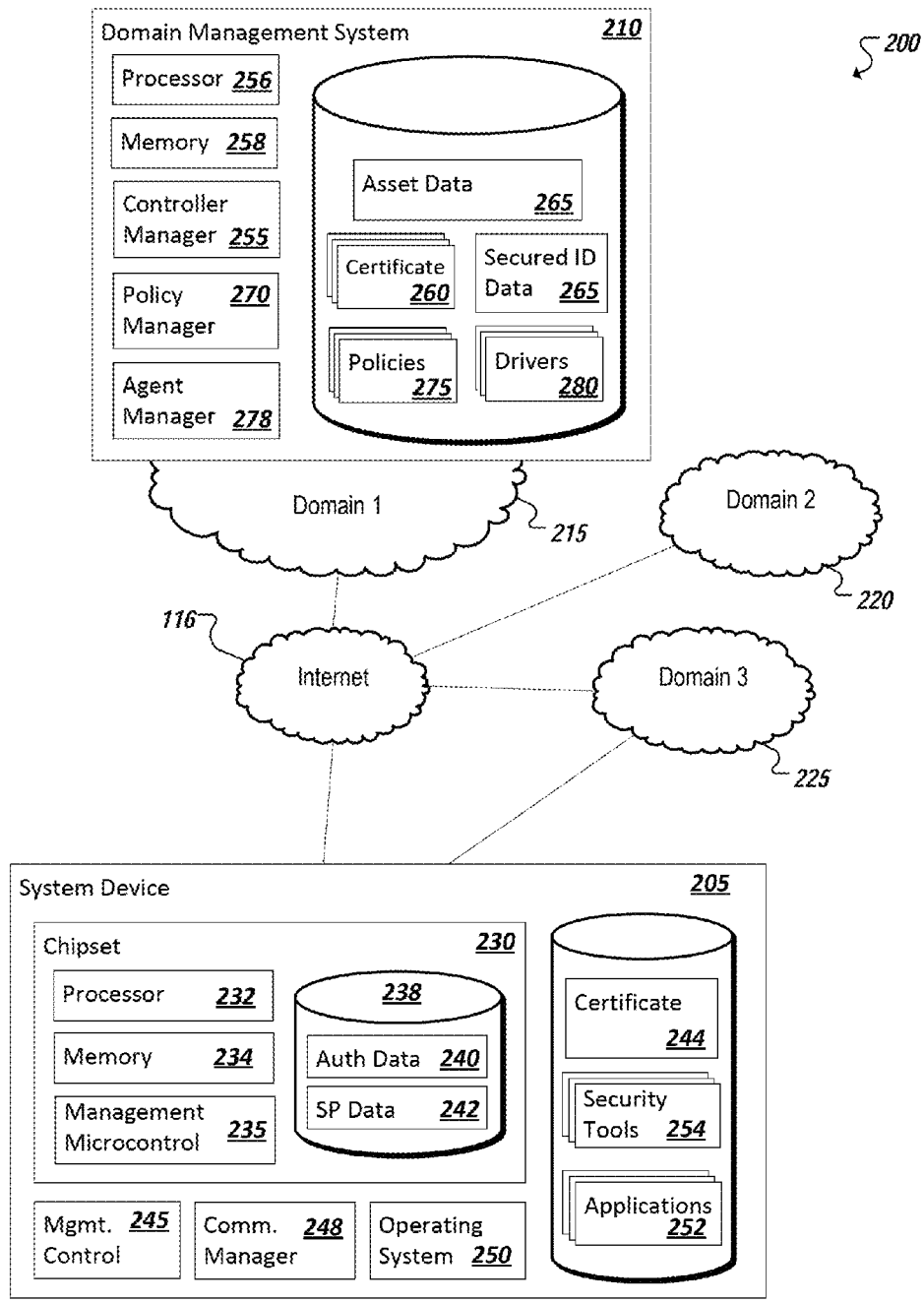
FIG. 2 is a simplified block diagram of an example computing system including an example domain manager adapted to interact with hardware-based management controllers on one or more system devices within the system in accordance with at least one embodiment.

In addition, security management can involve management of a wide variety of system devices including devices utilizing varying platforms and operating systems. At least some of the systems described in the present disclosure, such as the systems of FIGS. 1 and 2, can include functionality that, in some cases, can address the above-discussed issues, as well as others not explicitly described herein. For instance, to provide this level of functional support across the variety of system device platforms, functionality can be provided below the operating system in the hardware through an example management controller (e.g., 125a-125i). Such management controller functionality can be implemented, for instance, consistently across a variety of hardware platforms, such as in connection with a family of chipsets capable of being utilized in a wide variety of system devices. A secure and trusted API can be provided, based in hardware, with remote accessibility capabilities, enabling consistent and reliable access to security data and operations even in the absence of an agent or other such components.

While the characteristics and capabilities of hardware APIs between devices and domains can vary and evolve to accomplish a potentially limitless variety of tasks and provide a limitless array of potential features, identity of a system device, as rooted or based in hardware, can serve as the atomic unit upon which such services can be built. In some instances, in addition to providing functionality for generating secure identifiers for the system device, management controllers can further enable access by remote servers to other trusted identity information. For instance, turning to the example of FIG. 2, a simplified block diagram 200 is shown of a computing environment including an example system device 205 and a domain management system 210 of a particular domain 215. The particular domain 215 can be one of several domains (e.g., 220, 225) with which the system device 205 can interact. Each of the domains can implement domain management systems employing principles similar to those of the domain management system 210 of domain 215. Further, in some instances, the system device 205 can interact with domains directly, such as by connecting to a private network controlled by or associated with the domain (e.g., 225) or alternatively at least partially over public networks, such as the Internet 116.

In one example implementation, a system device 205 can include a chipset 230 that includes a processor 232, such as a central processing unit (CPU), and memory 234, such as memory including system memory utilized by the CPU and accessible to an operating system (e.g., 250) of the system device 205, among other examples. The chipset 230, in some examples, can additionally include a management microcontroller 235 that can provide secured processing functionality to perform management tasks outside of (or below) the control and instructions of the operating system. An example management microcontroller 235, in some implementations, can run a lightweight microkernel operating system that provides a low-power, out-of-band management controller. In some implementations, a secured memory 238 can be provided that is accessed and utilized by the management microcontroller 235 to perform device management activities including the generation of secure identifiers for the system device 205. Secured memory 238 can be separate from system memory and can be embodied, as one example, as a flash memory component of the chipset 230, among other examples. Secured memory 238 can include authentication data 240 used by the management microcontroller 235 to generate secure IDs for the system device 205 and can, in some instances, include secure IDs themselves. Secured memory 238, in some implementations, can additionally include security posture data 242 that describes attributes of the system device 205 that is securely contained and insulated from being altered, controlled, or manipulated by users of the device 205, the operating system 250, or other entities, including malware and hackers who might gain access to the device's system memory and/or operating system 250, among other examples. Additionally, secured memory 238 can additionally include, store, or point to instructions and software (e.g., 245) executed by the management microcontroller to provide the functionality of a management controller, including the generation and management of secure IDs and security posture data 242, among other examples.

In addition to secured processing and memory facilities, system device 205 can further include a communication manager 248 that can be used to enable secured communication channels between a management controller and domains and their respective domain management systems. In some implementations, communication manager 248 can be implemented in connection with management microcontroller 235 to permit the management microcontroller to access networks while the operating system of the system device 205 is inactive, absent, etc. Accordingly, management microcontroller 235 can have direct access to network interfaces of the system device. In some implementations, management microcontroller can run a fully independent, out-of-band communication channel (such as through a dedicated TCP/IP stack) allowing the microcontroller to inspect and receive packets not processed by the CPU, as well as inspect inbound and/or outbound traffic before the CPU has access to it. Effectively, two logical network connections can be maintained on a single physical networking connector of the device 205, one in-band through the CPU (e.g., 232) and the other out-of-band through the management microcontroller 235. Network filters in communication manager 248 can be utilized to programmatically redirect traffic to either a host operating system interface or the interface of the management controller at micromanagement controller 235, for instance, based on port numbers, among other implementations. An independent network communication channel can allow the management microcontroller 235 (and management controller implemented using the management microcontroller) to perform a variety of communications and remote management functions that can take place effectively potentially at all times without regard to the state of the operating system, for example.

Management microcontroller 235 can utilize independent and/or dedicated network communication channel(s) to communicate with outside systems, including management systems (e.g., 210) of domains (e.g., 215, 220, 225) over one or more networks (e.g., 116, network of domain 215, etc.). The management controller of the system device and domain management system (e.g., 210) can mutually authenticate in connection with their interaction, session, APIs, etc. In one example implementation, one or more certificates (e.g., 244) can be maintained corresponding to a certificate authority that issues the certificate to domains (for use through their respective domain management systems) evidencing that the domain is legitimate, trusted, and meets thresholds for qualifying as a domain authorized, under the certificate, to interface and communicate with hardware-based management controllers. Such certificates may be specific to a particular make, model, or implementation of a management controller in some implementations. Before communicating sensitive information to a domain management system, a management controller can verify that the corresponding domain management system possesses a copy of the certificate (e.g., 260) or is still an authorized holder of the certificate (e.g., based on a query to the certificate's authority). The management controller can in turn provide a secure identifier of the system device to authenticate the system device at the domain.

In some instances, certificates (e.g., 244) can be maintained on management controller-accessible memory (e.g., 238), together with security posture data 242, authentication data 240, and other information. Management controller-accessible memory (e.g., 238) can also be written-to by the management microcontroller. In some implementations, management controller-accessible memory (e.g., 238) can be non-volatile, protected memory, in that other hardware components of system device 205 and the operating system 250 of the system device 205 cannot access the memory 238, thereby ensuring the integrity and confidentiality of information stored in secured memory 238. Further, in addition to protected management controller-accessible memory (e.g., 238), management microcontroller 235 can, in some implementations, additionally access system memory (e.g., 234), allowing the management controller to access additional information concerning attributes of the system device 205 such as applications (e.g., 252) of the system device, security tools and countermeasures (e.g., 254) deployed on the device, activity and history of the system device, geolocation information for the device, user profiles of the system device, networks used or connected to by the device, etc. Such information can be used in the generation of security posture data 242 securely contained within the system device's 205 hardware in some implementations. Further, in some examples, a management controller can be further configured to manage the secure provisioning of agents, software updates, security tools, and other programs, features, and data onto the system device to enhance the functionality and security of the device, among other examples.

An example domain management system 210 can be embodied in computing devices, servers, and facilities of a domain to manage interaction with hardware-based management controllers of system devices connecting to and participating in the domain. For example, an example domain management system 210 can include one or more processors 256, one of more memory elements 258, among other tools and components such as a controller manager 255, asset manager 270, policy administrator 272, and agent manager 278, among other potential components. A controller manager 255 can provide functionality for identifying, authenticating, and managing sessions with one or more system devices (e.g., 205) attempting to make use of hardware-based management controllers in connection with the devices' interaction with the domain (e.g., 215). For instance, a controller manager 255 can manage mutual authentication of a domain (e.g., 215) and system device (e.g., 205), for instance, validating to the system device that it has been issued a certificate by a trusted authority and accepting and managing secure identifiers and other information from the system device. Further, the controller manager 255 can manage the system devices with which it has communicated, including those engaging the domain using a hardware-based management controller. For instance, controller manager 255 can maintain secure identifier data mapping secured IDs to individual system devices utilizing hardware-based management controllers.

Asset data 265 can also be maintained or made available to an example device management system 210, the asset data describing attributes of a plurality of assets included in or identified as accessing the domain, including system devices having hardware-based management controllers (e.g., 205). Asset data can be collected from a variety of sources, including installed agents on the individual assets, scans of the assets (e.g., by various security tools, local and/or network-based scanners, etc.), as well as from security posture data and other attribute data received via communications with assets utilizing hardware-based management controllers. Assets can include system devices, networks, applications, data structures, as well as human users making use of, included in, and/or administrating systems of the domain. Further, secure identifiers of client system devices can be maintained together with and/or mapped to profiles in asset data 265, among other examples.

In addition to a policy manager 270 providing functionality for dynamically assigning policies to particular system devices and enforcing these policies, in some implementations, a policy manager 270 can further include functionality for defining new policies, modifying existing policies, establishing rules and criteria for applying policies to particular system devices (e.g., based on detected attributes of the devices), and so on. A policy manager 270 can operate in cooperation with one or more security tools deployed within the network and locally on the system devices themselves. For instance, some security tools can be deployed remote from a system device allowing for policy enforcement to take place remote from the target system device, application, or person, thereby allowing security enforcement without the policy (or enforcement) being pushed to the target itself. This can be useful, for instance, in the security enforcement of mobile devices that move on and off of a monitored network, as well as unmanaged devices, such as devices not including agents or other local security tools capable of enforcing important security policies. Such security tools can include, for example, firewalls, web gateways, mail gateways, host intrusion protection (HIP) tools, network intrusion protection (NIP) tools, anti-malware tools, data loss prevention (DLP) tools, system vulnerability managers, system policy compliance managers, asset criticality tools, intrusion detection systems (IDS), intrusion protection systems (IPS), and/or a security information management (SIM) tool, among other examples. Nonetheless, security enforcement is also possible locally on a target system device, for instance, through security tools running, loaded, or otherwise interfacing directly with the system device. Security tools can further provide the management controller, in some instances, with an interface for enforcing policy directly at the target device. For instance, in some examples, agents deployed on system devices can serve as a security enforcement tool, for instance, blocking particular activities locally at the device according to one or more security policies applied to the particular system device, passing policy instructions to other security tools on the particular system device, among other examples.

Attribute information included in asset data 265 can be used to determine policies 275 to be applied to the individual asset. A policy manager 270 can be provided managing the development and enforcement of policies 275 within a domain (e.g., 215). In some instances, policies can be tailored to the individual asset based on the asset data. In other instances, pre-developed policies can be matched to assets based on the asset data. Policies 275 can include security and compliance policies, among other policies used to manage and govern a domain. For instance, access to data, applications, services, and other resources of the domain, security tasks, audits, scans, countermeasure deployment, updates, and other actions can be performed based on adherences to policies 275, among other examples. Further, for system device assets utilizing hardware-based management controllers, policy enforcement can attempt to leverage the management controllers to perform such tasks. As one example, information can be obtained from a system device allowing the domain management system 210 to identify drivers for the system device that can be downloaded or otherwise identified and accessed to permit the domain management system 210 to better communicate with and coordinate communication with the system device as well as communication between the system device and other computing devices within the domain.

In another example, a domain management system can include an agent manager 278 adapted to assist in the loading of agents on to various assets within the domain. In some implementations, an agent manager 278 can be used to load an agent onto a system device through a hardware-based management controller. The agent can then be used to assist in managing and identifying the system device. In some implementations, an agent manager 278 can assist in loading persistent agents on the system device, while in other examples, temporary, dissolvable agents can be loaded, for instance, corresponding with a given session between the system device (e.g., 205) and the domain 215.

The loading of agents, is but one of a potentially unlimited number of tasks and services that can be performed securely and effectively through a hardware-based management controller interfacing with a trusted domain management system to improve security, operability, and the feature sets of both the domain and the system device. Indeed, managed system devices (e.g., devices already having an agent), can themselves be improved through the provision of a hardware-based management controller. For instance, when an endpoint is altered due to re-imaging, operating system reinstallation, hardware updates (new disk, or new network cards), or simply uninstalling the agent, among other examples, the ability to identify the system and install a new, corresponding replacement agent can be based on re-identification of the system device based on its secured ID. This can also benefit provisioning of appliances either within a third-party domain (e.g., a customer environment) or in the cloud as the identity of a system device can be reliably and consistently verified. In addition, insuring that the device is in a known state during the boot phase can provide an additional data point that represents the trust level of the device prior to performing any sensitive tasks involving the device. Among other additional examples, "lying endpoint" attacks can threaten to compromise the integrity of an endpoint system device by calling into question the validity of the agent data being reported. Through a hardware-based secure ID generated through the hardware-based management controller, this entire category of problems can be negated due to the ability to reliably validate the identity of the system device.

Further, the security state of a system device can be extrapolated based on trustworthy security posture data (e.g., 242) to help refine the assessment of the risk that a particular asset poses to the environment before granting it access to the network. As another example, network monitors (such as firewalls, intrusion detection systems, intrusion prevention systems, and other security tools) can be improved by leveraging trustworthy secure ID data, rooted in hardware, in lieu of (or as a supplement to) other less-persistent or spoofable identifiers such as an IP address, MAC address, or the like. Through the secure networking capabilities of some implementations of management controllers, out-of-band network access to the security posture data and other resources of the secure memory (e.g., 238) can be enabled allowing for still additional features and services, including the performance of support and diagnostic tasks while the main processor, system memory, operating system, etc. are unavailable or not operable, among other examples and advantages.

Further, attribute information described in security posture data stored at the system device can be communicated to an authenticated domain management system using a management controller. Such information can include information identifying the type of system device and computing equipment on the system device, allowing the management system to either identify and/or retrieve device drivers corresponding to the system device. The attribute information, in one example, can include the identification of the make, model, and manufacturer of the system device's computing equipment and/or the system device itself. The attribute information can also include identification of firmware, operating systems, and other software used by the system device's computing equipment, including version information. Using the attribute information, management system (e.g., using controller manager) can identify sources (including remote sources) serving device drivers, updates, and other information for the system device and/or its computing equipment. Such information can then be used to perform various security-related tasks and improve transactions with the system device.

Figure 3:
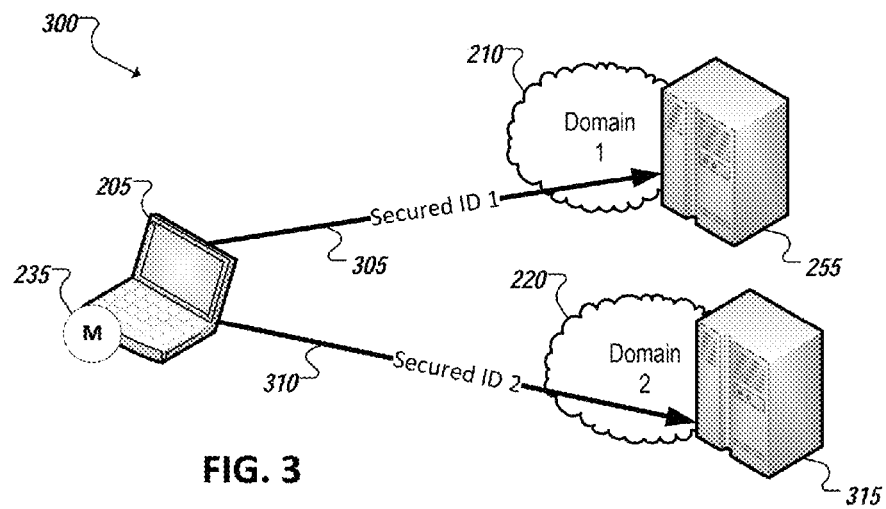
FIG. 3 is a simplified block diagram illustrating interactions between an example system device and a plurality of different domains in accordance with at least one embodiment.

Turning to the example of FIG. 3, a simplified block diagram is shown illustrating that a single system device 205 can maintain and provide multiple unique secure IDs (e.g., 305, 310), each secure ID corresponding to and unique to a particular pairing of the system device 205 with a different, respective domain (e.g., 210, 220). The system device 205, through hardware-based management controller 302, can generate or identify the secure ID corresponding to a particular domain and communicate the secure ID (e.g., 305, 310), outside the access and control of the device's 205 operating system, to the domain, such as to a domain management system of the domain, among other examples. The domain can then authenticate and identify the device from the secure ID.

Figure 4A:
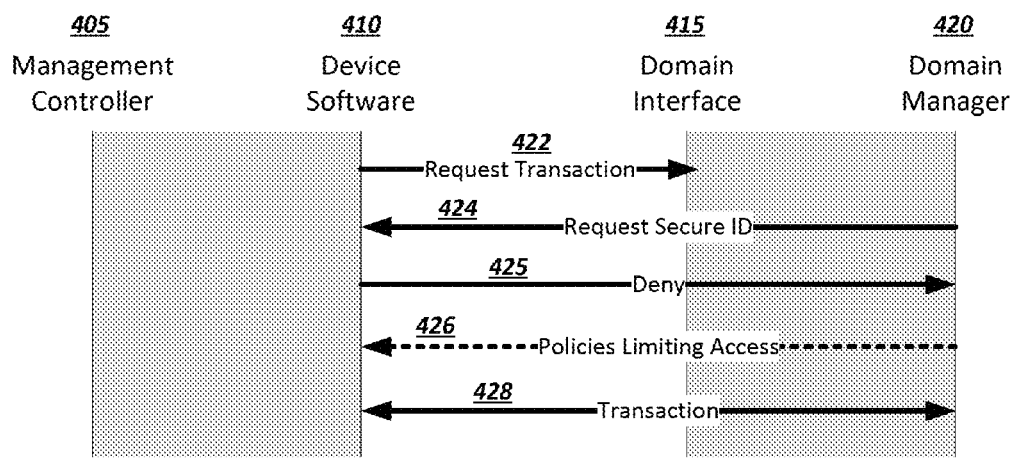
FIGS. 4A-4C are simplified flow diagrams illustrating example interactions between an example domain manager and an example system device having a hardware-based management controller in accordance with at least one embodiment.
Figure 4B:
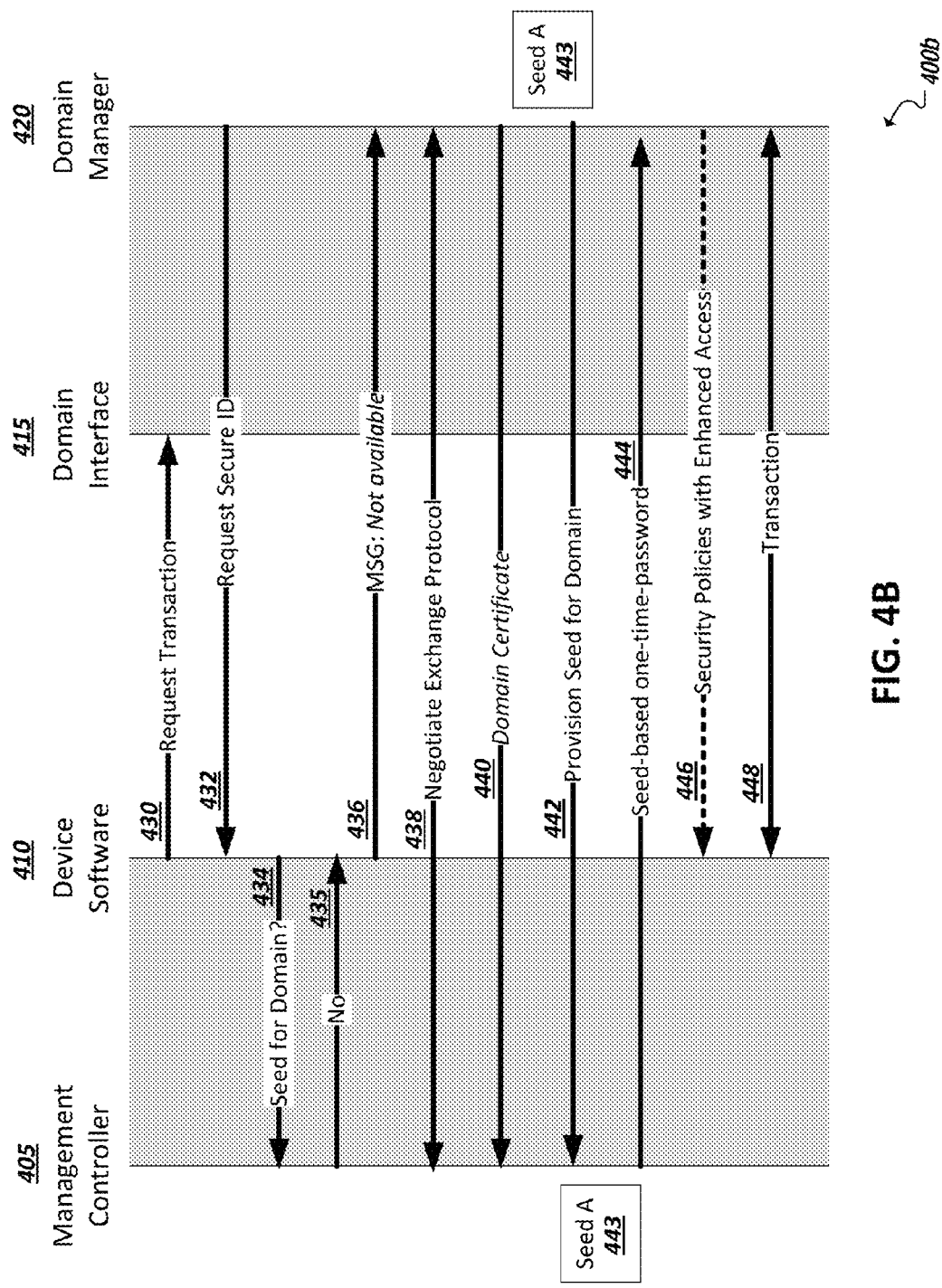
Figure 4C:
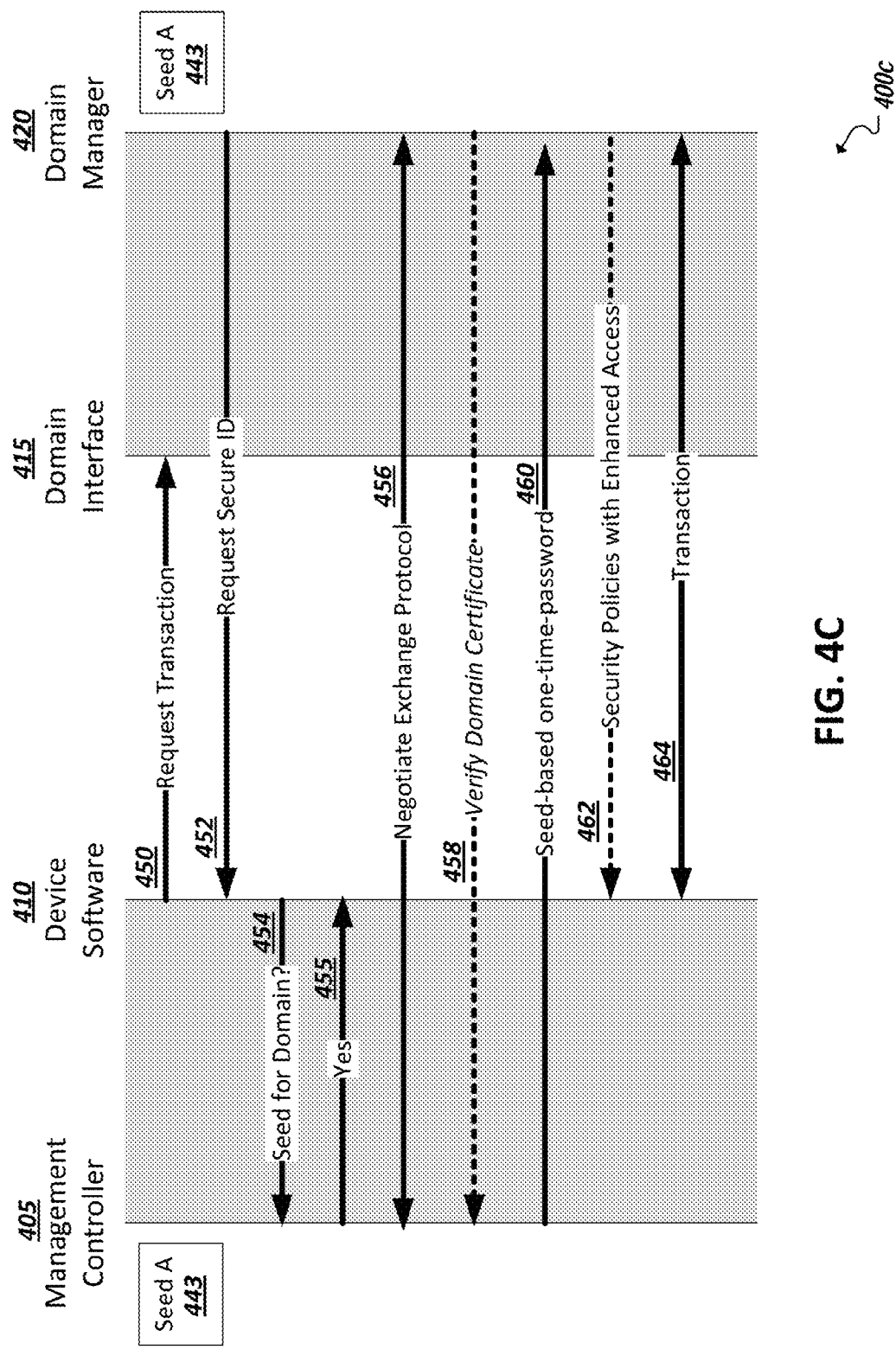

Turning to the examples of FIGS. 4A-4C, example flow diagrams 400a-c are illustrated showing example techniques in the generation and use of secure IDs for an example system device. In FIG. 4A, particular software 410 of a system device, such as applications within the operating system of the system device, can request a transaction 422 with a domain (e.g., at domain interface 415). The domain can utilize a domain manager (referred to elsewhere herein as a "domain management system") 420 to request 424 whether the system is capable of providing a trusted, hardware-based secure ID, for instance, through a secure, hardware-based management controller (e.g., 405) of the system device. The request 424 can also direct the system device to provide the secure ID to authenticate the system device at the domain. In the particular example of FIG. 4A, the system device returns a response 425 to the domain denying the request 424.

A denial (e.g., 425) can result from a variety of factors. In some instances, the domain may not have a valid certificate recognized by the system device (e.g., using management controller 405) as indicating that the domain is a trustworthy partner for communicating with the management controller 405, provisioning and/or sharing of a secure ID of the system device, sharing of security posture data with the domain, etc. In another example, the system device may not be equipped with a management controller compatible with the domain and its request 424. In still other examples, a secure session involving the management controller of the system device and the domain can be user-directed. For instance, in response to receiving the request 424, a user interface can be presented to the user on the system device requesting approval to engage the management controller 405 to set up a secure hardware-to-hardware communication between the system device and domain. In such instances, a user can freely elect to deny the domain the privilege of interfacing with the management controller of the system device, among other examples. In such instances, the system device can attempt to engage in a traditional session with the domain (e.g., transactions 428), without the assistance or features of a management controller 405 and a secure session established using management controller 405 and domain manager 420.

In the example of FIG. 4A, in response to the denial to establish a secure session with the domain manager 420, the domain manager 420 can cause a set of policies to be applied 426 to the system device. The set of policies can be default policies for any such system device, or similar model of system device, that does not (or cannot) provide the enhanced identification services of a secure ID and secured communication channel using a compatible management controller. Such policies can include security policies, ecommerce policies, etc. that result in a user of the system device enjoying a reduced level of access to the domain, its services, data, promotions, etc. In some instances, the requested transaction (e.g., at 422) of the system device can be conditioned on the exchange of a valid secure ID, the denial 425 resulting in denial of the requested transaction by the domain. In other examples, such as the example illustrated in FIG. 4A, the requested transaction can still be carried out (e.g., 428) despite the denial and the stricter policies 426 (such as more restrictive security policies) being applied to the system device during the transaction 428.

Turning to the example of FIG. 4B, another transaction request is forwarded from software 410 of a system device to a domain 415 resulting again in a request 432 for a secure ID from the system device. In this example, for instance, in response to a user approving a secure session with the domain at the system device, the device software 410 can query (e.g., at 434) the management controller 405 to determine whether a secure ID is available for the requesting domain. In one example implementation, a secure ID can be based on seed data received from the domain, wherein the management controller combines additional authentication data with the seed data or applies a particular algorithm securely entrusted and executed at the hardware-based management controller 405 to generate a secure ID based on the seed data. In some instances, the secure ID can be in the form of a one-time-password unique to the pairing of the domain with the system device. In the example of FIG. 4B, the management controller can determine that no seed exists for the requesting domain and communicate this result (e.g., at 435) to the system device software. This can indicate, in some instances, that no pairing as yet been established between the system device and domain.

As shown in the example of FIG. 4B, the system device can communicate (e.g., at 436) to the domain that no seed has yet been received from the domain but that a secure session is desired with the domain. The system device, using management controller 405, can then negotiate 438 a secured exchange protocol with the domain in order to facilitate the secure and secret communication of the domain seed to the management controller 405 of the system device, protecting the seed from being identifiable to the operating system of the system device as well as third party snoopers, among other examples. In some implementations, in order to mutually authenticate the domain (e.g., the domain manager 420 of the domain) to the system device, the domain manager 405 can additionally send 440 a domain certificate (e.g., issued by a trusted certificate authority) to the system device in connection with the domain-specific seed 443 (e.g., sent at 442) using the negotiated secure channel (e.g., established at 438).

The secure channel can be further used to provision a domain seed 443 unique to the pairing of the system device and domain on the management controller 405 of the system device. Consequently, copies of the seed 443 can be persistently stored at each of the domain manager 420 and the management controller 405 following the provisioning 442 of the seed 443 on the management controller 405. The seed 443 can be stored as authentication data for the domain in secure memory of the management controller 405. The management controller can then use the seed 443 to generate a one-time password based on the seed that the management controller can communicate to the domain manager. The form of the one-time password can be negotiated and agreed upon between the management controller 405 and domain manager 420. In one example, the one-time password can be generated by concatenating or hashing a combination of the seed 443 and a domain identifier, such as a four byte domain ID. The domain ID can be included, for instance, in the certificate communicated 440 to the management controller 405. In another example, the one-time password can be based on a hash or concatenation of a system clock value with the seed.

Upon receiving the one-time password (or other secure ID generated from the seed at the management controller 405) the domain can verify that the system device participating in the session with the domain is the same system device to which the seed was communicated based on the one-time password. Based on the identification and authentication of the system device, any security posture data transmitted by the management controller, and attribute information otherwise gathered from the system device, policies can be applied 446 by the domain manger 420 on the system device during transactions 448 between the system device and domain manager. In some implementations, authentication of a system device at a domain via a secure ID based on a domain seed (e.g., 443) can result in more permissive policies being applied 446 to the system device in the domain, in some instances, enhancing the access, permissions, services, and features available to the system device during the transaction session 448 with the domain.

Turning to the example of FIG. 4C, a subsequent transaction between the system device and the domain is represented. In this example, the domain seed 443 provisioned on the system device remains stored in secured memory of the management controller 405 as well as in memory of the domain manager 420. Additional authentication data can also be stored in secured memory of the management controller 405, such as a domain ID of the domain corresponding to the seed 443. The transaction can be requested 450 by the system device triggering a request 452 by the domain manager 420 for a secure ID of the system device. In some instances, a user can be presented with an option to engage in a secured session with the domain, while in other instances, the user can indicate that, following provisioning of the seed 443, future sessions with the domain should be automatically secured without direct user approval, among other examples and alternatives. Further, the management controller 405 can be queried 454 for whether a seed has been provisioned for the requesting domain. The management controller 405 can respond to the query 454 by identifying the seed 443 in secured memory and replying 455 that the seed 443 has been provisioned. The management controller 405 and domain manager 420 can again negotiate and establish (e.g., at 456) a secured channel for communicating the secure ID of the system device. Alternatively, a previously negotiated secure communication protocol can be identified and applied to establish a secure communication channel between the management controller 405 and the domain manager 420. Additionally, to authenticate the domain manager to the system device, the management controller 405 can re-verify 458 the domain certificate of the domain, for instance by determining whether the certificate is from a valid certificate authority and determining whether the domain remains a valid holder of the certificate (e.g., by checking a listing of approved, or alternatively, rogue domains identified by the certificate authority, among other examples).

Upon authenticating the requesting domain manager 420 and establishing 438 a secured communication channel, the management controller can generate an instance of a one-time password based on the seed 443 and communicate 460 the one-time password to the domain manager 420. The domain manager 420 can also independently generate the one-time password and compare it against the one-time password received (at 460) from the management controller 405 to authenticate that the management controller 405 is indeed a holder of one of the seeds (e.g., 443) previously generated and provisioned on the system device with which the domain has a pre-existing relationship (e.g., as established in the example of FIG. 4B). Accordingly, the domain manager 420 can identify (or re-identify) security policies corresponding to the system device identified by the seed-based secure ID (e.g., the one-time password) and apply 462 the security policies to the system device during transactions 464 completed with the system device during the secure session established between the management controller 405 and domain manager 420.

In some implementations, multiple different seeds (including seed 443) can be stored on secure memory of a management controller 405, each seed corresponding to a particular pairing of the management controller's 405 system device and a respective domain. In some implementations, seeds (and other authentication data) in secured memory cannot be tampered with or modified and can persist in memory to survive system wipes, operating system installations, and the like affecting other memory of the system device. In order to protect privacy of a user, however, a user can cause the management controller to reset or delete seeds and other authentication data in secure memory, including a full reset of all secure IDs, authentication data, and other identifiers in secure memory. For instance, upon selling or otherwise disposing of the system device, the user may wish to wipe hardware-based secure IDs so that another user is not able to utilize previous secure IDs used by the former user to authenticate to the profiles associated with the former user within certain domains, among other examples.

Other types of secure IDs can be used and generated by a management controller. As another example, as illustrated in the simplified block diagrams of FIGS. 5A-5B, one or more secure IDs can alternatively be generated from a persistent hardware identifier (e.g., 525) of the system device, rather than a collection of seeds provided by the domain and stored in connection with the management controller. For instance, turning to the simplified flow diagram 500a of FIG. 5A, a system device (e.g., through the system device operating system and applications running on the operating system, and other device software 510) can request a transaction or session with a Domain A (e.g., interfacing with Domain A interface 515). A domain manager 520 of Domain A can be utilized to attempt to establish a secure session making use of the functionality of a management controller 505 of the system device. For instance, the domain manger 520 can request 535 a secure ID from the system device to authenticate (and potentially re-identify) the system device. As in the examples of FIGS. 4A-4C, a user can be presented with and given the option of permitting a secure session to be established with the domain, as well as setting rules and/or preferences for the session. For instance, a user can set rules, preferences, or parameters for establishing what security posture data and types of data can be shared with the requesting domain (e.g., in some cases varying the amount of data that is shared based on the particular identity of the domain), establishing whether the management controller 505 can automatically attempt to join a secure session with a domain (or subset of user-identified domains) (e.g., by skipping a user authorization step), among other examples.

Figure 5A:
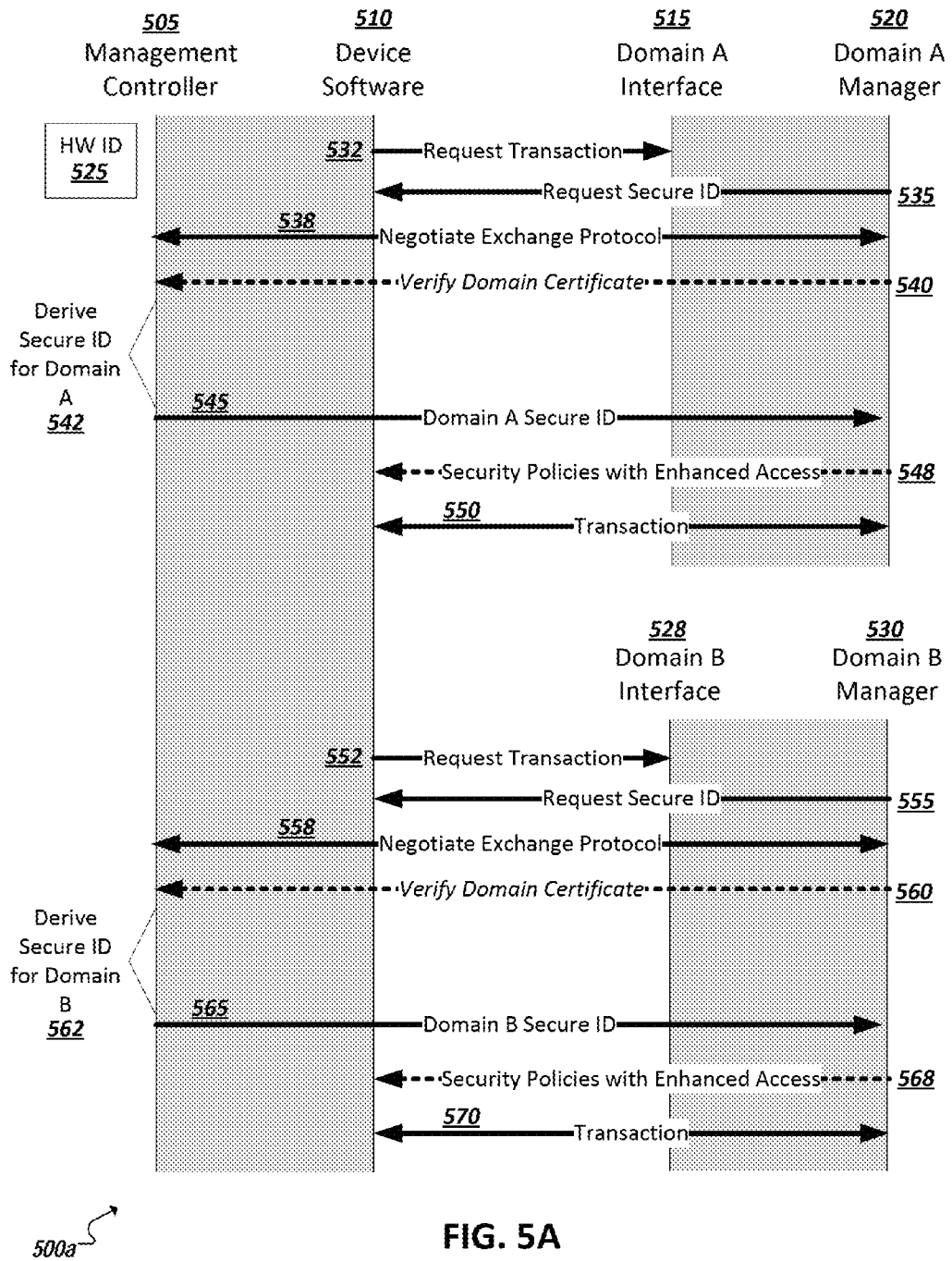
FIG. 5A is a simplified flow diagram illustrating interactions between an example system device having a hardware-based management controller and a plurality of example domain managers in accordance with at least one embodiment.

Further, as in the examples of FIGS. 4A-4C, a secure communication channel can be established 538 for communications between the management controller and domain manager (and outside of the control and interpretation of the system device's operating system). Further, the management controller 505 can be provided 540 with a domain certificate of Domain A to authenticate the domain manager 520 as a trustworthy partner for the secure session (e.g., as in previous examples). In some instances, the domain certificate can be passed 540 to the management controller 505 in connection with the negotiation and construction (e.g., 538) of a secure communication channel. In the example of FIG. 5A, the management controller 505 can identify information in the domain certificate that identifies the domain. In some instances, the domain certificate can include data that uniquely identifies the domain. The management controller 505 can use the management controller's secure (and secret) hardware identifier 525, together with the domain identifier to generate a secure ID unique to the pairing of the management controller 505 (and corresponding system device) and the domain manager (and corresponding domain). In some instances, the secure ID can be derived through a hash of the secure hardware identifier 525 and the domain identifier, among other examples.

Upon deriving the secure ID from the hardware ID 525, the management controller 505, as in other examples, can then return the secure ID 545 to the domain manager to identify and authenticate the management controller (and system device) at the domain. The domain manager 520 can then determine whether the secure ID has been previously received at the domain or is a new secure ID within the domain. In instances where the secure ID matches a previously-received secure ID, the domain manager 520 can identify a pre-generated profile and profile data corresponding to the secure ID, and re-associate the system device with the profile based on the secure ID. In instances where the secure ID is determined to be a new secure ID for Domain A, the domain manager 520 can generate a profile record corresponding to the new secure ID. Similar techniques can be applied to the example implementations described in connection with FIGS. 4A-4C. A profile record can be used to collect and store security data describing security-related attributes of the device (and/or user) associated with the management controller 505 and secure ID. Other attributes can also be recorded in a profile record and associated with the secure ID including, for example, session information, user profile information, browsing history, account information, etc. corresponding to and collected during the system device's interactions and transactions in the domain (e.g., using the management controller 505). In this manner, the domain manager can reliably identify the use of a particular system device within the domain based on the secure and trustworthy secure ID. The domain manager 520 may then, as in other examples, determine security policies (and other policies) tailored to the attributes of the system device and apply 548 these policies to the system device in transactions 550 within a secure session between the management controller and domain manager 520.

Figure 5B:
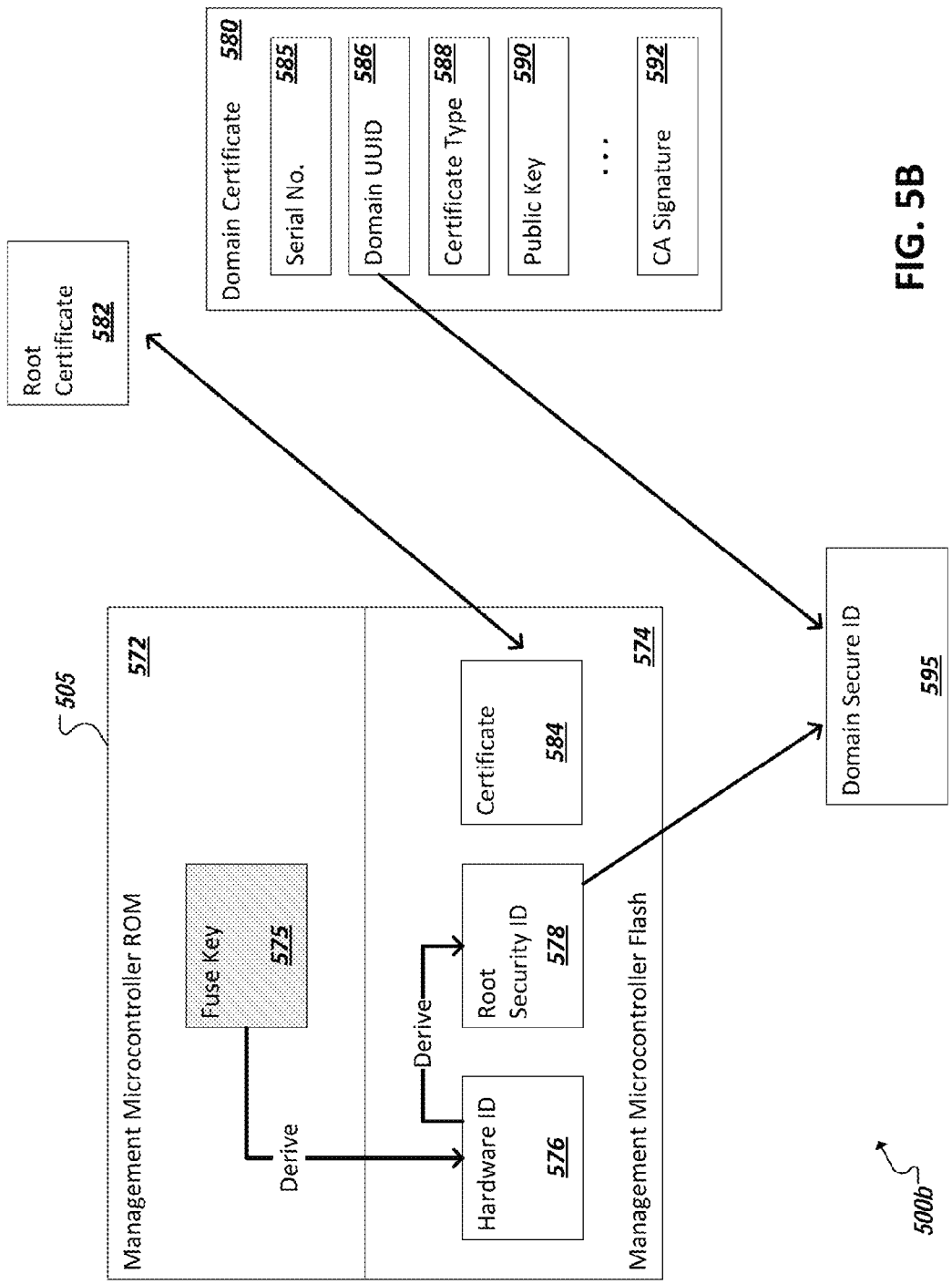
FIG. 5B is a simplified block diagram illustrating generation of a secure identifier for an example system device in accordance with at least one embodiment.

Turning to FIG. 5B, a simplified block diagram 500b is shown illustrating components and interactions involving an example management controller 505. In this particular example implementation, management controller 505 can include a management microcontroller with secure management microcontroller read-only memory 572 that is accessible to the management microcontroller but isolated from other elements of the system device, such as the CPU, operating system, etc. The management microcontroller memory 572 can include a fuse key 575 or another permanent identifier embedded in hardware of the system device. Such permanent hardware IDs can be set during fabrication of the system device chipset and be unique and private to the system device. In some instances, in order to assist in preserving the privacy of users of the system device, a separate, private hardware ID 576 can be derived from the fuse key value 575. In some instances, the hardware ID 576 is a permanent identifier stored in flash memory of the management controller 505 (e.g., as it is based on a permanent fuse key value) and can be derived so that it is also globally unique. In still other examples, multiple hardware IDs 576 can be generated for a single device. For instance, in interactions with domains and service providers that provide multiple different services (e.g., email, ID management, content providers, online retail, social networking, etc.), multiple different hardware IDs can be used to generate multiple secure IDs for a single device-domain pairing, with each secure ID paired to a particular service or context of the device-domain pairing. This can assist in preventing user or device data from being cross-associated across the multiple services of a domain, among other examples.

In some instances, the hardware ID 576 derived from the hardware fuse key 575 can be used in the generation of secure IDs used in establishing secure sessions with a domain. In other implementations, a further hardware-based identifier, or root ID 578, can be derived from the hardware ID 576. For example, the root ID 578 can be a persistent identifier stored in flash memory (e.g., 574) of the management microcontroller. In some implementations, the root ID 578 may be reset and replaced as desired by a user to generate new root IDs 578 derived from the same hardware ID. For example, while the root ID 578 can be protected from manipulation or tampering by a user, operating system and corresponding applications, third-parties, etc., a user, to protect privacy, can nonetheless be permitted the option of deleting a root ID and prompting generation of a new, different root ID using the management controller. It should be appreciated that secure IDs derived from the new root ID will be different from the secure IDs derived from the previous root ID in some implementations. Consequently, users can manually disassociate their system devices from previous profiles maintained by various domains and associated with a previous secure ID value derived from a previous root ID by resetting the root ID and thereby replacing the previous root ID value with a new root ID from which new secure IDs are derived.

As shown in the example of FIG. 5B, a certificate 584 can also be maintained on flash memory of the management microcontroller. The certificate 584 can be a copy of a root certificate 582 of a trusted certificate authority authorizing and authenticating domain managers as trusted partners in communications with hardware-based management controllers (e.g., 505). The copy of certificate 584 can be used in connection with authentication of a domain manager, for instance, in response to domain certificates (e.g., 580) received or associated with a particular domain in connection with mutual authentication of the management controller and domain manager, establishing a secure connection between the management controller and domain manager (e.g., using a secure exchange protocol), etc. The management controller, for instance, can utilize the certificate 584 to verify domain certificates (e.g., 580) received from a domain manager. An example domain certificate 580 can include a serial number 585, domain unique identifier 586, certificate type field, public key 590 of the certificate, signature of the certificate authority 592, among potentially additional data that can be used in connection with identification and authentication of a corresponding domain manager.

As further shown in the example of FIG. 5B, in some implementations, a management microcontroller (of a management controller) can receive the domain certificate and process the domain certificate 580 to identify a domain identifier 586 value of the domain. The same domain identifier 586 can be included in every domain certificate received from the domain (or other message used by the domain to communicate the domain identifier). The management microcontroller can then derive a unique secure ID 595 specific to the pairing of the system device and the domain from the domain identifier and root ID. For instance, the secure ID 595 can be derived by combining the domain identifier and root ID, for instance, through a hash of the domain identifier and root ID values. In this particular example, rather than storing a set of various domain seeds in secure flash memory 574 of the management microcontroller, a single root ID (or, in some alternative implementations, the hardware ID 576) can be stored in flash memory 574, allowing the same domain-specific secure ID to be derived and re-derived each time the system device attempts to establish (and re-establish) a secure session with a given domain, the management microcontroller accessing and utilizing the same combination of persistent root ID 578 and domain ID 586 inputs.

Returning to the example of FIG. 5A, as noted above, a hardware-based ID 525 (such as hardware ID 576 or root ID 578, as examples), can be used to derive multiple secure IDs, each secure ID corresponding to a respective domain. For instance, the system device can interact (e.g., at 552) with a second domain, Domain B (e.g., via domain interface 528). A domain manager 530 of Domain B can request 555 a secure session and secure ID of the system device, allowing a user to specify whether such a session with Domain B is desired. A secure exchange protocol and connection can be negotiated 558 as in previous examples, together with the authentication of the second domain manager 530 based on, for instance, a domain certificate of Domain B. In some implementations, the domain certificate of each domain (e.g., Domains A and B) can be provided through a common certificate authority, such as a certificate authority responsible for identifying partner domains meeting thresholds for compatibility and trustworthiness with a particular make, model, and/or manufacturer of a chipset including the management controller, etc.

Continuing with the example of FIG. 5A, as with the session with Domain A, the management controller 505 can utilize information from the domain certificate (such as a unique domain identifier (e.g., 586)) together with the hardware ID 525 to derive a secure ID corresponding to the system device's pairing with Domain B. The secure ID can then be communicated 565, over the secure communication channel, to the domain manager 530. The domain manager 530 can map the received secure ID to a profile maintained by the domain manager and identify policies tailored to the system device (or to system devices generally that utilize a management controller to establish a secure session with the domain)

that can be applied 568 to the system device during the session including transactions 570.

In some implementations, a system device, through management controller 505, can concurrently participate in multiple secure sessions with multiple different domains (e.g., Domains A and B). Similarly, in the seed-based implementation described in connection with the examples of FIGS. 4A-4C, multiple concurrent sessions can be managed using a management controller. In some implementations, a management controller can maintain session data identifying a session, secure communication parameters of the session (e.g., the exchange protocol used, keys and encryption schemes used, etc.), the domain involved in the session (together with the authentication status, domain identifier, etc.), among other data for tracking the domain, session, and corresponding secure ID to be used during the session.

It should be appreciated that in some implementations, a management controller can be configured to derive secure IDs according to multiple different protocols and schemes. For instance, in some implementations, a management controller can be configured to both derive secure IDs based on seed data received from domains (e.g., as in the examples of FIGS. 4A-4C) and derive secure IDs from hardware-based hardware ID data (e.g., as in the examples of FIGS. 5A-5B). For instance, both a root ID (e.g., 578) for use in hardware-ID-based secure IDs and seeds (e.g., 443) can be stored and maintained by a management microcontroller in secure flash memory (e.g., 574). Indeed, in some implementations, a root ID (or other hardware ID) can be used together with seed data to derive one-time-passwords or other secure IDs for use with some domains, among other examples. For instance, seed data can be used as a domain identifier and hashed or otherwise combined with a hardware ID to generate a secure ID. In some instances, a management controller can identify, for instance, from the identity of the requesting domain or the domain's request for a secure ID which secure ID format to apply to the requesting domain, among other examples.

As noted in the above examples of FIGS. 4B-5B, secure communication channels can be negotiated and established between a management controller of a system device and domain manager of a domain. In some instances, the negotiation of the exchange protocol used to establish the secure communication channel can include the passing of certificates and other data identifying the domain for use by the system device in authenticating the domain manager for interactions with the system device's hardware-based management controller. In some example implementations, key-based encryption can be utilized to secure communications between a domain manager and management controller. Further, in some implementations, a secure key exchange protocol can additionally be used to securely exchange the keys used in the encrypted channel. The channel can be secured to hide the content of secure IDs, seeds, authentication data, security posture data, and other information transmitted from (or to) the management controller from other components, processors, applications, operating systems, etc. of the system device. In this manner, data communicated by the management controller to the domain can be protected from manipulation or influence by users, applications, or other entities attempting to compromise, advertently or otherwise, the legitimacy of data maintained by the management controller.

Figure 6A:
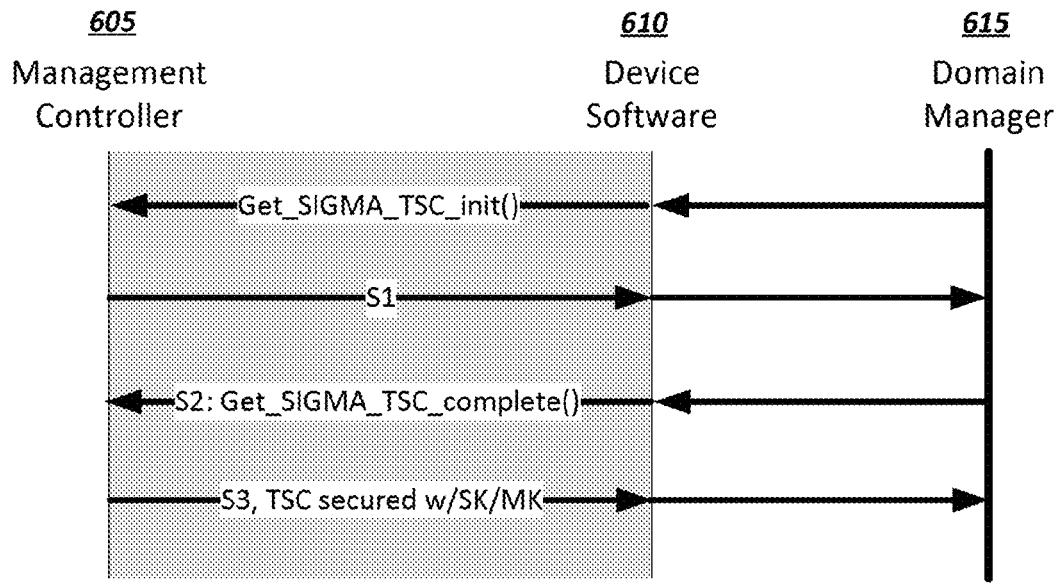
FIG. 6A is a simplified flow diagram illustrating negotiation of an example secure channel between an example system device and an example domain manager in accordance with at least one embodiment.

In some implementations a key-exchange protocol can be utilized that permits mutual authentication and secure key exchange in connection with the establishment of a secure communication channel between a management controller and domain manager. In some implementations, a protocol can be used that is both secure (e.g., from man-in-the-middle, unknown key share, identity misbinding, and other attacks) and maintains privacy of the identity of at least one of the parties (e.g., the management controller in this example). In one example implementation, an encrypted communication channel can be established between a management controller and domain manager utilizing a SIGMA key exchange protocol or other protocol that establishes secret shared keys through a sign and mac mechanism as well as principles of Diffie-Hellman exchanges. For instance, turning to the example of FIG. 6, a simplified flow diagram 600 is shown illustrating an example SIGMA exchange between a management controller 605 and domain manager 615, permitting the negotiation of secure IDs outside the influence of the software 610 of the system device. In the example of FIG. 6, system device software 610 provides 625 a public value S1. The value S1 can include, in some instances, a public base $g^x$ of the management controller 605. In response, the domain manager 615 can send 630 S2, confirming the request for the secure ID and including: $g^y$, B, $SIG_B(g^x,g^y)$, $MAC_{Km}(B)$, where $g^y$ is the public base of the domain manager, B is the public key of the domain manager, $SIG_B(g^x,g^y)$ is the signature of $g^x$ and $g^y$, and $MAC_{Km}(B)$ is the mac of B. In response, the management controller 605 can send S3 including A, $SIG_A(g^y,g^x)$, $MAC_{Km}(A)$, as well as, in some instances, the secure ID encrypted using the key B of the domain manager.

In some implementations, communications between a management controller (e.g., 605) and domain manager (e.g., 615) can be leveraged to derive a secure ID corresponding to the system device's pairing with the corresponding domain. As in the examples above, the secure ID can be utilized to provide hardware-based authentication of the management controller's device within the domain, among other examples. For instance, in the example of FIG. 6B, a simplified flow diagram 600b is shown including an example management controller 605 and device software 610 of an example device together with respective domain interfaces (620, 628) and domain mangers of (615, 630) of domains adapted to accept hardware-based device authentication through management controller 605. For examples, a transaction request 632 can be transmitted from the device to the domain causing a SIGMA handshake to be initiated (e.g., at 635). In response, domain manager 640 can communicate 640 the S2 value in the handshake to the management controller 605. Additionally, a domain "basename" value, or domain identifier, can be included in or appended to the transmission 640 of S2 that uniquely identifies the domain. The management controller can receive the S2 value and identify the domain identifier and attempt to verify the authenticity of the domain at least in part based on the domain identifier. Further, the management controller 605, as in the examples of FIGS. 5A-5B, can use a persistent hardware ID and derive 642 a secure ID for the device using the domain identifier and hardware ID 625. The derived secure ID can be unique to the pairing of the device and the domain. In some instances, a key derivation function can be used to derive the secure ID.

After deriving the secure ID, the management controller 605 can respond to the SIGMA S2 communication 640 by communicating S3 645. In this example, the management controller 605 can cause the secure ID to be included in the communication 645. Domain manager 620 can receive the communication 645 to both complete the SIGMA negotiation as well as obtain the secure ID value derived by the management controller 605. Other information can also be conveyed by the management controller for use in verifying the identity of the device, such as the make, model, version, etc. of the device, among other examples. Further, security policies can be applied 648 to the device by the domain based on the hardware-based authentication of the device and one or more transactions 650 can be completed between the device and domain. Additionally, session keys derived from the domain-specific basename (e.g., at 640) can be used to bind the pairing of the client device and domain to the transactions 650, providing another layer of security allowing the client device and domain to verify the identity of the other party throughout the transactions, among other examples and benefits.

Figure 6B:
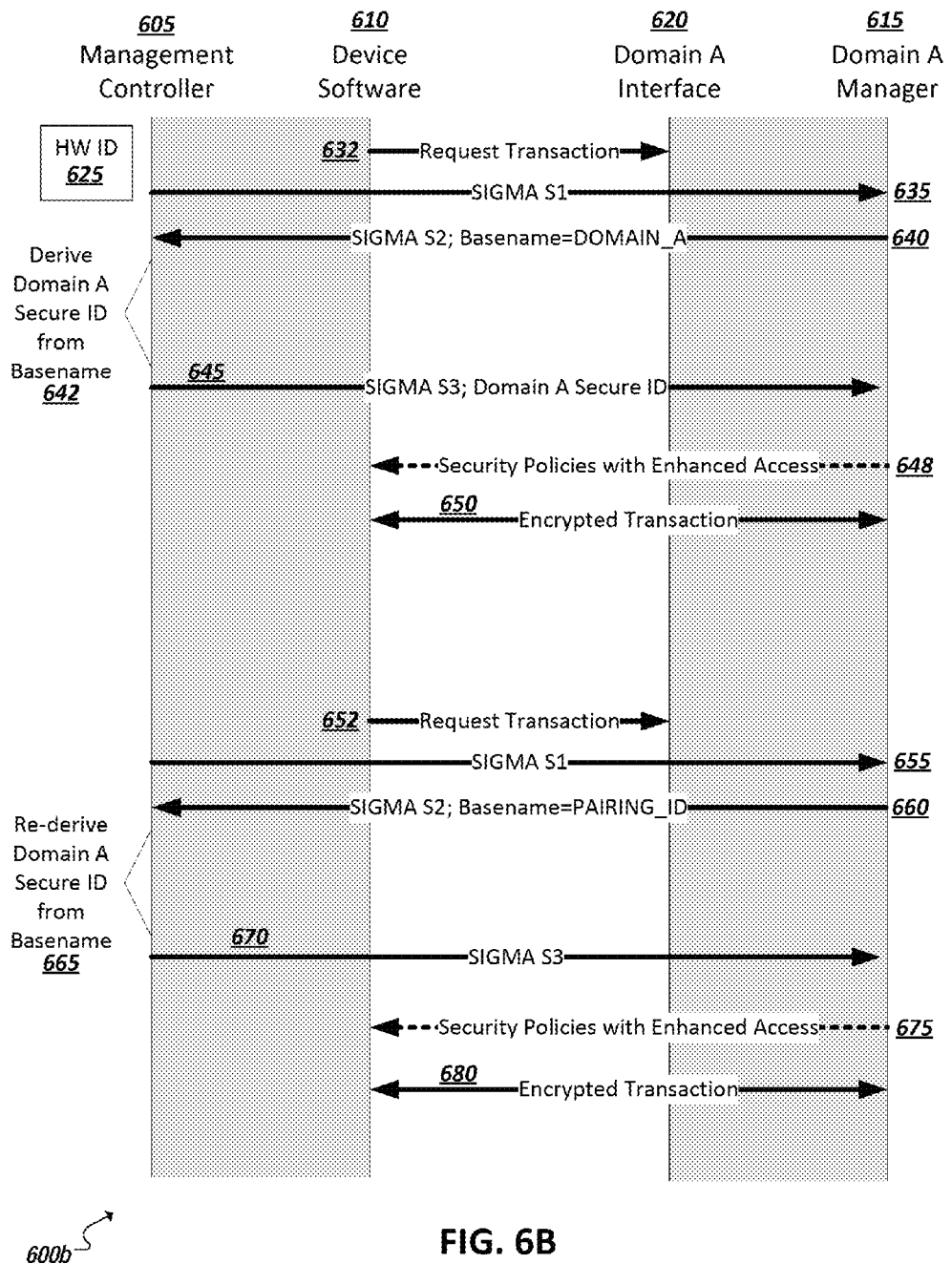
FIG. 6B is a simplified flow diagram illustrating interactions between an example system device having a hardware-based management controller and a plurality of example domain managers in accordance with at least one embodiment.

As in the examples of FIGS. 5A-5B, after initially deriving and sharing the hardware ID-derived secure ID with the domain manager, subsequent transactions can cause the secure ID to be re-derived to re-authenticate the device to the domain manager. For instance, as shown in FIG. 6B, a subsequent transaction request 652 can be sent from the same device to the same domain. A SIGMA negotiation can again be initiated 655. In response, the domain manager can provide a pairing-specific ID with the S2 response 660. For example, the pairing-specific response can include the same domain identifier from its original S2 response (e.g., 640). The management controller can recognize the domain from the identifier and attribute sessions resulting from the SIGMA negotiations to the domain. In other instances, pairing identifier can include the derived secure ID (e.g., received at 645). In such instances, multi-tenant privacy is provided along with assurances to both the client device and the domain that each party to transactions 680 is authentic. For example, the management controller can perform key derivation operations on the received secure ID (e.g., the "PAIRING_ID" of 660) to derive the original domain identifier (e.g., received at 640). In other instances, the original domain identifier can be included in or appended to the S2 response incorporating the secure identifier as the pairing identifier basename to assist the management controller in verifying that the domain is a legitimate holder of the secure ID (e.g., based on the management controller 605 re-deriving 655 the secure ID from the re-provided domain identifier), among other examples. In either instance, the management controller 605 can confirm the identity of the domain (e.g., on the basis that the domain knows the secure ID). In some cases, the management controller can re-verify its identity by passing the re-derived secure ID back (at 670) to the domain manager 615 through the completion of the SIGMA negotiation, among other examples. The domain manager 615 can identify the secure ID from the SIGMA message 670 and query a database or other structure to see if the secure ID is a known secure ID. In this example, the domain manager 615 can identify that the secure ID corresponds to the device, reauthenticate the device, and re-apply the security policies to the device. Further, the domain manager 615 can apply information collected during previous transactions (e.g., 650) with the device to refine the policies applied 675 to the device in subsequent transactions (e.g., 680) as well as tailor services, products, and user experience offerings based on previously collected information mapped to the device and indexed by the secure ID of the system device. Additionally, session keys for transactions 680 derived from the pairing identifier basename can be utilized to bind the transactions 680 to the pairing of the client device and the domain, among other examples and implementations applying the above principles.

Figure 7B:
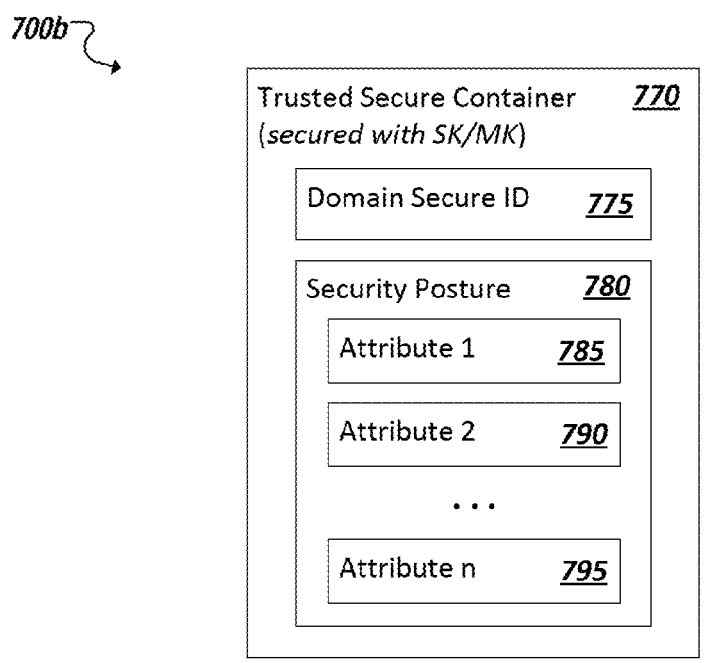
FIG. 7B is a simplified block diagram illustrating an example secure container in accordance with at least one embodiment.
Figure 7A:
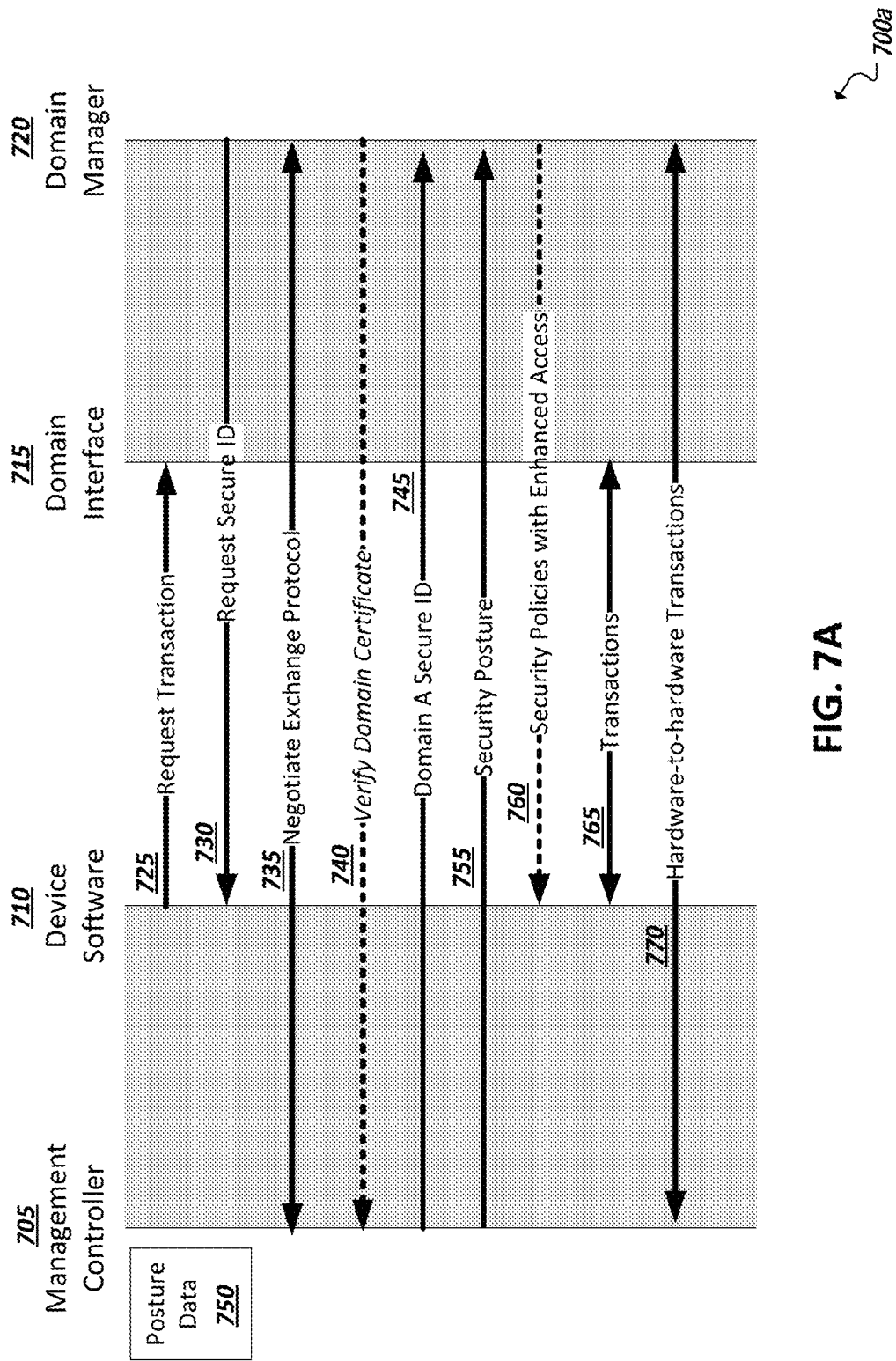
FIG. 7A is a simplified flow diagram illustrating interactions between an example domain manager and an example system device having a hardware-based management controller in accordance with at least one embodiment.

Turning now to the example of FIG. 7A, a simplified flow diagram 700a is shown illustrating a hardware-based management controller's involvement in the secure communication and management of security posture data and other data describing attributes of the system device. For instance, as in previous examples, a domain manager 720, in response to a system device's attempt to initiate 725 one or more transactions with the domain (e.g., at domain interface 715), can attempt to initiate a secure session with the system device through a request 730 for a secure ID of the system device. A secure communication session can be established 735 and the certificate of the domain can be verified 740 in connection with an authentication of the domain. Using approaches similar to those of either (or a combination of) the examples of FIGS. 4A-5B, as well as other approaches, a secure ID can be derived by the management controller 705 and communicated 745 to the domain manager 720. In the example of FIG. 7A, upon establishing a secure connection with the domain manager 720, the management controller 705 can additionally pass 755 at least a portion of security posture data 750 over the secure channel to the domain manager 720. In some implementations, the portion of the security posture data 750 can be communicated together with the secure ID as a security container structure, allowing the domain to more directly identify and bind the security posture data to the system device profile identified through the secure ID.

Security posture data 750 can include a variety of data describing attributes of the system device. In some instances, security posture data 750 can describe persistent attributes of the system device, such as identifiers of the model and manufacturer of the chip set, identification of the system device, system device, type, etc. and other information. Such persistent attributes can, in some examples, be pre-loaded (e.g., at manufacture) onto secure memory of the management controller. Other data may describe more dynamic attributes of the system device. For instance, the management controller can access and query system memory, peripherals of the system device, other processors of the system device, the operating system of the system device, and other system device entities to identify and collect other attributes of the system device. Such collected attributes can also be added to and included in the security posture data. Additionally, the management controller 705 can additionally monitor and identify updates and changes to attributes of the system device and capture these changes in security posture data.

As with seeds, root IDs, and other authentication data maintained in secure memory of the management controller, security posture data describing various attributes of the system device can be isolated from control or influence of the user, operating system, third parties, etc. thereby providing a secure and trustworthy repository, or container, for recording the attributes of the system device that may be useful in sharing with domains with which the system device interacts. Sharing (e.g., at 755) security posture data can permit the domain manager to better identify aspects of the system device, influencing which policies, such as security policies, are applicable to the device and allowing the domain manager to better tailor application 760 of the policies to transactions involving the system device and domain. Such transactions can include not only software-based transactions (e.g., 765) but also hardware-to-hardware transactions, such as transactions between the management controller 705 and a domain manager 720.

Turning to FIG. 7B, an example trusted secure container 770 is shown, in accordance with one example implementation. The secure container can package the secure ID 775 of the system device in the domain together with a set 780 of security posture data to be communicated to the domain manager for use in introducing the system device to the domain manager, for instance, at the beginning of a secure session or when providing an API between the domain and management controller. In one example implementation, the set of security posture data 780 can describe one or more system device attributes such as boot policies of the system device, an OEM public key hash for the system device, among other examples. Indeed, a variety of security posture attributes can be included in security posture data maintained by the management controller and capable of being shared with one or more domain managers. For instance, the operating system type, version, patches, etc. can be identified and maintained in security posture data together with the applications installed on the system device. In some instances, security posture data can also identify the countermeasures and security tools deployed on the system device. An identification of user profiles, use history and statistics, behavioral information, and other information describing users of the system device can also be collected (e.g., from other sensors collecting such data on the system device). Additionally, security profile data can described attributes including geopositional information collected from the device (e.g., from global positioning system components of a system device), present operating state of the device can be identified (e.g., whether the device is on/off, battery/charge level, etc.), the mode of the device (e.g., how the device is being used, collected for instance from accelerometers or other components of the device).

Some of the attributes included in security posture data can be highly device dependent. For instance, a system device, such as an in-dash computer of an automobile can include information describing the functions and state of the automobile as monitored by the computer. Similar state information can be collected by management controllers included in the chipsets of smart appliances. As should be appreciated, the types of attribute data that can be potentially collected and maintained in security posture data can be as varied and diverse as the ever expanding variety of smart devices, personal computing devices, peripherals, and other devices including networking and computer processing capabilities.

The portion and type of security posture data that is shared by a management controller 705 can vary from domain to domain. In some instances, the management controller can identify a minimum amount of information requested by the domain and provide only this minimum set. In addition to an initial set of security posture data (e.g., as encapsulated in a trusted secure container 770), the management controller 705 can utilize the secure session to communicate additional security posture data on an as-needed, or as-requested basis to the domain based on the types of interactions between the domain and the system device. For instance, a transaction involving the system device's consumption of a particular service provided by the domain can call for specific types of information concerning the system device included in security posture data.

Security posture data can provide an up-to-date and trustworthy accounting of attributes of the system device that are relevant to a domain's assessment of the security of the system device. Based on the attributes of the device as communicated in security posture data, a domain can better appreciate the vulnerabilities and security profile of the system device, allowing the domain to more accurately and comprehensively apply security policies and take preventative measures to account for the weakness (or strength) of the system device's security profile. Indeed, while in some instances a secure session between a system device and a domain can result in more permissive policies being applied to the system device, in other instances, upon receiving security posture data from the system device indicating critical vulnerabilities or other troubling attributes, the domain may actually apply more restrictive policies to interactions with the system device based on the security posture data.

FIGS. 8A-8F are simplified flowcharts 800a-f illustrating example techniques, involving a hardware-based management controller of a computing device attempting to transact with a domain. In the example of FIG. 8A, a computing device attempts 802 to access a particular domain and based on an initial communication with the domain receives 804 a request from the particular domain (e.g., from a domain manager of the particular domain) to participate in a secure session with the domain. A domain seed can then be identified 806 that is provisioned on secure memory of the management controller. In some instances, the identification 806 of the seed can be concurrent with the receipt of the seed from the particular domain, while in other instances, the seed may have been received in a previous transaction with the particular domain, and the previously previsioned seed can be identified in secure memory of the management controller. The seed can be secure in that it is only accessible, at the system device, by the management controller, causing the value of the seed value to be hidden from the operating system, central processor, and other more accessible components of the system device.

The management controller can derive 808 a one-time password from the seed. The derived one-time password can be a password that can be deconstructed by the particular domain to identify the secret seed and thereby authenticate that the computing device is the same device on which the seed was originally provisioned. In some instances, the one-time password can be derived based on a combination (such as a hash) of the seed and another value known to both the management controller and the particular domain, such as an identifier of the domain, an identifier of the device, system clock value, counter value, date, or code word among other potential examples. In some implementations, a different one-time password can be generated from the seed each time the system device attempts to join a secure session with the particular domain. The one-time password is communicated over a secure connection established between the system device and the domain and used 810 to authenticate the system device in the domain. The secure connection can be established by the management controller and the particular domain, in some cases, including the authentication of the particular domain, for instance, through the sharing of a domain certificate of the particular domain with the management controller. In some implementations, a key exchange protocol can be included in the establishment of a secure communication channel, such as a SIGMA key exchange protocol.

Turning to FIG. 8B, from the perspective of the particular domain, such as at a domain manager of the particular domain, a system device's attempt to access the particular domain can be identified 812 prompting, for instance, a request to be sent 814 to the system device to participate in a secured session with the particular domain. A one-time password can be received 816, for instance, over a secure communication channel established between the particular domain and the system device, the one-time password derived by the system device from a seed of the particular domain provisioned on secure memory of the system device. The particular domain can authenticate 818 the system device based on the one-time password. Authentication 818 can, in some instances, include the particular domain deconstructing the one-time password to identify the underlying domain seed. In other instances, the particular domain also derives the one-time password from the seed (known both to the particular domain and the system device) and compares the one-time password received by the system device with the one-time password derived independently by the particular domain (e.g., the domain manager), among other examples.

Having authenticated 818 a system device for participation in a secure session with the particular domain, the particular domain can then continue to communicate with and perform transactions involving the hardware-based management controller of the system device. Additionally, based on the system device permitting the interface with the management controller, the particular domain can apply (e.g., 820) particular policies, such as a security or other policies, to the system device during the session, for instance, based on an enhanced level of trust established through the secure session. In some instances, security posture data or other data describing attributes of the system device can be received in the secure session (or during authentication of the system device) from the management controller and policies applied to the system device can be based on or tailored to account for the described attributes. The attributes communicated by the management controller can be considered to be more trustworthy than attribute data communicated by other, non-hardware-based components of the system device more prone to manipulation, spoofing, etc.

Turning to the example of FIG. 8C, a system device can attempt 822 to access a particular domain and receive 824 a request from the domain to participate in a secure session with the domain. A domain identifier of the particular domain can be received 825, for instance, in connection with the receipt of a domain certificate from the particular domain. The domain certificate, in some implementations, can be received in connection with the negotiation of a secure communication channel (e.g., in a key exchange) between the particular domain and the system device. Further, a persistent hardware identifier can be identified 826 in secure memory of a management controller of the system device. The hardware identifier can be a secret value accessible only to the management controller and protected from manipulation by the central processor, operating system, and other elements of the system device. In some implementations, the hardware identifier can be based on identifiers permanently embedded in hardware of the device and set during the device's manufacture, such as a fuse key. The management controller can derive 828 a secure identifier from the domain identifier and hardware identifier, such as through a hash of the domain identifier and hardware identifier. The secure identifier can be unique to the pairing of the system device with the particular domain and can be hidden and protected from other elements of the system device. The management controller can then communicate 830 the secure identifier to the particular domain, for instance, over the secure communication channel between the system device and particular domain. The secure identifier can be private to the management controller and particular domain, ensuring, to the particular domain, that the secure identifier is authentic. Further, other data can also be communicated together with the secure identifier to assist the particular domain in identifying and working with the system device. Such data can include security posture data and other data describing attributes of the system device, among other examples.

Turning to the example of FIG. 8D, from the standpoint of the particular domain (e.g., at a domain manager of the particular domain), the system device's attempt to access the domain can be identified 842 prompting a request to be sent 844 to the system device inviting participation in a secure session with the particular domain. A domain identifier can be communicated 846 as well to the system device, for instance, in response to the system device accepting the request to participate in the secure session. The domain identifier can be communicated in a domain certificate sent to the system device in connection with an authentication of the particular domain (or domain manager) at the system device and/or the establishment of a secure communication channel between the system device and the particular domain. A secure identifier can then be received 848 from the system device, for instance, over the secure communication channel, the secure identifier derived from the domain identifier and a persistent hardware identifier maintained in secure memory of the system device. Other data, such as security posture data, can also be received and associated with the secure identifier (and thereby the system device). On the basis of the secure identifier (and other data, such as the security posture data), the particular domain can identify policies relevant or applicable to the system device. Such policies can be applied 850 to transactions involving the system device and the particular domain and can include security policies, ecommerce policies, data access policies, regulatory compliance policies, and among others.

Turning now to the example of FIG. 8E, as noted above, a management controller can be used to provide security posture data in connection with a secure session between the management controller's system device and a particular, authenticated domain. Such security posture data can be maintained, together with authentication data, such as domain seeds, hardware identifiers, secure identifiers, etc., in secure memory of the management controller so as to insulate the data from manipulation by users, applications, malware, third parties, and other entities that might benefit from supplying incorrect or falsified data to the particular domain, among other examples. A secure identifier can be derived 852 by the management controller, from authentication data stored in secure memory, the secure identifier corresponding to a particular pairing of the system device with a respective domain. The system device can potentially derive secure identifiers for pairings with multiple different domains. Further, a variety of techniques can be utilized to generate the secure identifiers, including techniques adopting principles of the example implementations described above.

In addition to a secure identifier, the management controller can identify 854 and access security posture data describing attributes of the system device. In some instances, the security posture data can be securely collected by the management controller and include data describing boot policies, encryption keys and protocols, security tools and countermeasures deployed on the system device, operating systems and applications installed and running on the system device, hardware specifications and configurations of the system device, current use status of the system device, geographical positioning of the system device, among a variety of other data that can be collected that describes operation and status of the system device, its software, hardware, networks, users, etc. In some implementations, a portion of the security posture data can be packaged with the secure identifier for secure delivery (e.g., 856) to a particular domain. In some instances, a secure container can be provisioned to deliver the secure identifier and that portion of the security posture data that allows for the particular domain to interface with and make use of other functionality of the management controller and, in turn, the system device. Accordingly, the secure identifier and security posture data can be securely communicated 856 to the particular domain for use by the particular domain in identifying and authenticating the system device on the domain, among a wide variety of additional, potential uses. Additional security posture data can also be shared through the secure connection during a session between the management controller and the domain.

Turning to FIG. 8F, from the perspective the particular domain, a secure communication channel can be established 860 with a system device having a management controller. In some instances, the particular domain negotiates the secure communication channel with the management controller. In some examples, an out-of-band communication channel of the management controller hardware can be utilized to communicate with the particular domain. A hardware-derived secure identifier can be received 862 from the system device over the secure channel. Additionally, security posture data can also be received 864 from the system device, the security posture data also managed and maintained by the hardware-based management controller. Indeed, in some implementations, a secure identifier and security posture data can be sent together in a secure container over the secure communication channel. The particular domain can process the security identifier to authenticate the system device and, in some cases, identify an associated profile corresponding to the system device. The particular domain can further process the security posture data to identify one or more attributes of the system device that are germane to one or more policies or rules of the particular domain. The system device can then, in turn, perform 866 one or more security-related tasks based on the received secure identifier and/or security posture data. Such tasks can include the installation of an agent on the system device via the management controller, among many other examples. For instance, device information can be identified that permits the particular domain to identify and access one or more drivers for use in better communicating with the system device, as well as coordinating communication between the system device and one or more other devices in the domain.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, one or more processor devices. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them or other examples. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In general, subject matter of the present disclosure includes methods, software, computer executable instructions, and systems capable of performing such tasks as deriving, using a secured microcontroller of a computing device, a secure identifier unique to a pairing of the computing device and a particular domain, and identifying, in secured memory of the computing device, security posture data corresponding to attributes of the computing device. The secure identifier and security posture can be sent in a secured container to a management device of the particular domain.

In one example, a system can be provided that includes a system processor device, system memory accessible to the system processor device, secure management controller memory, a secure management microcontroller, and a management engine. The secure management controller memory can be isolated from the system processor and system memory and store persistent authentication data and security posture data corresponding to attributes of a computing device. A management engine can be adapted, when executed by the management microcontroller, to derive a secure identifier from the authentication data, the secure identifier unique to a pairing of the computing device and a particular domain. The management engine can be further adapted to cause the secure identifier and security posture to be sent in a secured container to a management device of the particular domain.

In some instances, the secured container can be sent to the particular domain over a secure communication channel. The secure channel can be negotiated between the particular domain and computing device, for instance, using a key exchange protocol such as a SIGMA key exchange protocol. The particular domain can be authenticated at the computing device and a secure application programming interface (API)

to a management controller executed by the secure microcontroller can be provided based on the authenticating of the particular domain. Additionally, a certificate can be received from the particular domain and the particular domain can be authenticated based at least in part on the received certificate.

In some instances, the secure microcontroller can be used to derive a second secure identifier unique to a pairing of the computing device and a second domain and the second secure identifier and at least portion of the security posture data can be sent to the second domain. The secured microcontroller can be independent of an operating system of the computing device and values of secure identifiers derived by the secured microcontroller can be hidden from the operating system. Further, at least a portion of the security posture data can be collected using the secure microcontroller.

Further, in some instances, the secure identifier can be derived based on a secure, persistent hardware identifier of the computing device stored in secure memory of the secured microcontroller and deriving the secure identifier can include hashing the hardware identifier with a domain identifier of the particular domain. The hardware identifier can be secret to the secured microcontroller. In other instances, the secure identifier can be derived based on a seed provisioned on the secured memory by the particular domain over a secure communication channel, where the seed is unique to the computing device within the particular domain. In such examples, deriving the secure identifier can include identifying the seed in secured memory as corresponding to the particular domain, and generating a one-time-password from the seed, where the particular domain derives the seed from the one-time-password to authenticate to the computing device. Further, security posture data can include boot policies of the computing device and other attributes. Such attributes can include a hardware configuration of the computing device, a state of use of the computing device, software installed on the computing device, the operating system of the computing device, among potentially many other examples.

In another general aspect, subject matter of the present disclosure includes methods, software, computer executable instructions, and systems capable of performing such tasks as establishing a secure connection between a particular domain and a particular computing device, and receiving from the particular computing device a secure identifier for the particular computing device, the secure identifier derived by a secured microcontroller of the particular computing device from authentication data stored in secure memory of the particular computing device. Further, receiving security posture data of the particular computing device bound to the particular secure identifier can be received, the security posture identifying attributes of the particular computing device. A security task can be performed relating to interactions of the particular computing device with the particular domain.

In some instances, the security task can include such actions as applying a security policy to the particular computing device, identifying a driver corresponding to the particular computing device based on the security posture data, loading an agent onto the particular computing device through the secure microcontroller, among other examples. A domain identifier can be provided for authenticating the particular domain at the particular computing device. Additionally, in some instances, a second secure identifier for a second computing device can be received together with second security posture data, and a security task can be performed relating to interactions of the second computing device with the particular domain, among other examples and combinations of the foregoing.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    deriving, using a secured microcontroller of a client computing device, a secure identifier comprising a one-time password unique to a pairing of the client computing device and a particular domain comprising at least one second computing device, the secure identifier derived based at least in part on seed data received from the particular domain, the seed data separate from a domain identifier of the particular domain and unique to the pairing of the client computing device and the particular domain, the seed data stored in a secured memory of the client computing device inaccessible to an operating system of the client computing device;
    identifying, in the secured memory of the client computing device, security posture data corresponding to attributes of the client computing device; and
    sending the secure identifier and the security posture data together in a secured container to a management device of the particular domain.

2. The method of claim 1, wherein the secured container is sent to the particular domain over a secure communication channel, the secure communication channel comprising an out-of-band communication channel between the secured microcontroller and the particular domain independent from an in-band communication channel between a central processing unit of the client computing device and the particular domain.

3. The method of claim 2, further comprising:
    negotiating with the particular domain to establish the secure communication channel.

4. The method of claim 3, wherein negotiating the secure communication channel includes a key exchange protocol.

5. The method of claim 4, wherein the key exchange protocol is a SIGMA key exchange protocol.

6. The method of claim 1, further comprising:
    authenticating the particular domain at the client computing device; and
    providing a secure application programming interface (API) to a management controller executed by the secured microcontroller based on the authenticating of the particular domain.

7. The method of claim 6, further comprising receiving a certificate from the particular domain, wherein the particular domain is authenticated based at least in part on the received certificate.

8. The method of claim 1, further comprising:
    deriving, using the secured microcontroller, a second secure identifier unique to a pairing of the client computing device and a second domain;
    identifying, in the secured memory of the client computing device, security posture data corresponding to attributes of the client computing device; and
    sending the second secure identifier and at least a portion of the security posture data to the second domain.

9. The method of claim 1, wherein the secured microcontroller is independent of the operating system of the client computing device and values of secure identifiers derived by the secured microcontroller are hidden from the operating system.

10. The method of claim 1, further comprising collecting at least a portion of the security posture data using the secured microcontroller.

11. At least one non-transitory machine accessible storage medium having instructions stored thereon, the instructions when executed on a machine, cause the machine to:
- derive, using a secured microcontroller of a client computing device, a secure identifier comprising a one-time password unique to a pairing of the client computing device and a particular domain comprising at least one second computing device, the secure identifier derived based at least in part on seed data received from the particular domain, the seed data separate from a domain identifier of the particular domain and unique to the pairing of the client computing device and the particular domain, the seed data stored in a secured memory of the client computing device inaccessible to an operating system of the client computing device;
- identify, in the secured memory of the client computing device, security posture data corresponding to attributes of the client computing device; and
- send the secure identifier and the security posture data together in a secured container to a management device of the particular domain.

12. The non-transitory storage medium of claim 11, wherein the seed data is to be provisioned on the secured memory by the particular domain over a secure communication channel, wherein the seed data is to be unique to the client computing device within the particular domain, the secure communication channel comprising an out-of-band communication channel between the secured microcontroller and the particular domain independent from an in-band communication channel between a central processing unit of the client computing device and the particular domain.

13. The non-transitory storage medium of claim 12, wherein deriving the secure identifier includes:
- identifying the seed data in the secured memory as corresponding to the particular domain; and
- generating the one-time-password from the seed data, wherein the particular domain derives the seed data from the one-time-password to authenticate to the client computing device.

14. The non-transitory storage medium of claim 11, wherein the security posture data is to include boot policies of the client computing device.

15. The non-transitory storage medium of claim 11, wherein the attributes are to include a hardware configuration of the client computing device.

16. The non-transitory storage medium of claim 11, wherein the attributes are to include a state of use of the client computing device.

17. The non-transitory storage medium of claim 11, wherein the attributes are to include software installed on the client computing device.

18. The non-transitory storage medium of claim 17, wherein the attributes are to include an operating system installed on the client computing device.

19. A system comprising:
- a system processor device;
- system memory accessible to the system processor device;
- secure management controller memory isolated from the system processor device and the system memory and adapted to store:
  - persistent authentication data; and
  - security posture data corresponding to attributes of a client computing device;
- a secure management microcontroller; and
- a management engine adapted, when executed by the secure management microcontroller, to:
- derive, using the secure management microcontroller, a secure identifier comprising a one-time password unique to a pairing of the client computing device and a particular domain comprising at least one second computing device, the secure identifier derived based at least in part on seed data received from the particular domain, the seed data separate from a domain identifier of the particular domain and unique to the pairing of the client computing device and the particular domain, the seed data stored in the secure management microcontroller memory; and
  - send the secure identifier and the security posture data together in a secured container to a management device of the particular domain.

20. The system of claim 19, wherein the secure management microcontroller is to send the secured container to the particular domain over a secure communication channel, the secure communication channel comprising an out-of-band communication channel between the secure management microcontroller and the particular domain independent from an in-band communication channel between a central processing unit of the client computing device and the particular domain.

* * * * *